(12) United States Patent
Tamukai

(10) Patent No.: US 12,200,049 B2
(45) Date of Patent: Jan. 14, 2025

(54) COMMUNICATION TERMINAL DEVICE, INFORMATION COMMUNICATION SYSTEM, STORAGE MEDIUM, AND INFORMATION COMMUNICATION METHOD

(71) Applicant: MegaChips Corporation, Osaka (JP)

(72) Inventor: Kengo Tamukai, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 0 days.

(21) Appl. No.: 18/199,387

(22) Filed: May 19, 2023

(65) Prior Publication Data
US 2023/0403322 A1 Dec. 14, 2023

(30) Foreign Application Priority Data
May 20, 2022 (JP) .................................. 2022-082747

(51) Int. Cl.
*H04L 67/104* (2022.01)
(52) U.S. Cl.
CPC ...... *H04L 67/1051* (2013.01); *H04L 67/1048* (2013.01)
(58) Field of Classification Search
None
See application file for complete search history.

(56) References Cited

U.S. PATENT DOCUMENTS

| | | | |
|---|---|---|---|
| 5,691,980 A | 11/1997 | Welles, II et al. | |
| 6,901,275 B1 | 5/2005 | Aoyagi | |
| 10,771,279 B2 | 9/2020 | Sawa | |
| 2003/0124979 A1* | 7/2003 | Tanada | H04W 84/20 455/507 |
| 2005/0083859 A1 | 4/2005 | Kang | |
| 2005/0086273 A1 | 4/2005 | Loebbert et al. | |

(Continued)

FOREIGN PATENT DOCUMENTS

| | | | | |
|---|---|---|---|---|
| CN | 1797253 A | 7/2006 | | |
| EP | 3024277 A1 * | 5/2016 | ........... | H04L 67/104 |

(Continued)

OTHER PUBLICATIONS

Office Action mailed on Dec. 22, 2020 received for JP Application 2017-091511, with English Translation, 8 pages.

(Continued)

*Primary Examiner* — Phyllis A Book
(74) *Attorney, Agent, or Firm* — XSENSUS LLP

(57) ABSTRACT

A communication terminal device has circuitry configured to: judge, based on received information, whether or not source of the received information is intra-group communication destination; monitor whether or not the intra-group communication destination is the master unit based on the judgement; acquire the judging criterion information of the intra-group communication destination detected as the master unit; and switch, while the self device is operating by a master unit operation mode and when the other master unit is detected by monitoring, a master unit operation mode of the self device to a slave unit operation mode based on the judging criterion information of the self device and the judging criterion information of the other master unit.

14 Claims, 10 Drawing Sheets

(56) References Cited

U.S. PATENT DOCUMENTS

| | | | |
|---|---|---|---|
| 2005/0262216 | A1 | 11/2005 | Kashiwabara et al. |
| 2006/0259155 | A1* | 11/2006 | Kitahara ............... G05B 15/02 |
| | | | 700/3 |
| 2009/0240781 | A1 | 9/2009 | Otsuka |
| 2010/0074155 | A1* | 3/2010 | Park ..................... H04W 76/15 |
| | | | 370/310 |
| 2014/0198778 | A1 | 7/2014 | Fraser |
| 2014/0232883 | A1 | 8/2014 | Sakai |
| 2018/0323998 | A1* | 11/2018 | Sawa ............... H04L 12/40202 |
| 2019/0268834 | A1 | 8/2019 | Jung et al. |

FOREIGN PATENT DOCUMENTS

| | | |
|---|---|---|
| JP | 2010-277467 A | 12/2010 |
| JP | 2011-130307 A | 6/2011 |
| JP | 2011-135608 A | 7/2011 |
| JP | 2011-199704 A | 10/2011 |
| JP | 2018-191116 A | 11/2018 |
| WO | 2005/034434 A1 | 4/2005 |

OTHER PUBLICATIONS

Office Action mailed on Dec. 30, 2020 received for CN Application 201810325890.1, with English Translation, 28 pages.

Extended European Search Report issued Oct. 17, 2023 in European Patent Application No. 23173820.4, 10 pages.

Partial European Search Report mailed on Jul. 17, 2018, received for EP Application 18169853.1, 20 pages.

Extended European Search Report mailed on Sep. 5, 2018, received for EP Application 18169853.1, 21 pages.

Qualcomm et al., "Time variations of gap patterns with Bluetooth streaming", 3GPP TSG-RAN WG2 Meeting #72, R2-106342, Nov. 11-15, 6 pages.

Office Action mailed on Jan. 22, 2020, received for EP Application 18169853.1, 10 pages.

Office Action mailed on Dec. 30, 2020 received for JP Application 201810325890.1, with English Translation, 28 pages.

* cited by examiner

COMMUNICATION TERMINAL DEVICE, INFORMATION COMMUNICATION SYSTEM, STORAGE MEDIUM, AND INFORMATION COMMUNICATION METHOD

CROSS REFERENCE TO RELATED APPLICATIONS

The present application claims priority from Japanese Application Number 2022-082747 filed in Japan on May 20, 2022, the contents of which are incorporated herein by reference.

BACKGROUND

Technical Field

The present disclosure relates to techniques for determining a master unit and a slave unit, in the information communication system containing a plurality of communication terminal devices.

Description of the Background Art

Conventionally, in a group of devices that should form one network, there is a technique for detecting a situation in which multiple master units coexist and determining one master unit, for example, Patent Literature 1 (Japanese Patent Application Laid-Open No. 2018-191116). It is described in.

In recent years, for example, electrical equipment has become a communication terminal device, and as these electrical devices are connected to a network, there are cases where a plurality of networks each composed of a plurality of communication terminal devices are installed. That is, with the emergence of large-scale networks, there have been cases where the networks themselves are grouped according to installation locations, the number of terminals, or usage.

In the technique described in Patent Literature 1, when a plurality of networks are grouped, for example, if communication in another group's network is unintentionally intercepted, it is misidentified that a plurality of master units coexist. As a result, a problem arises that a plurality of networks, which should be independent networks, are integrated by one master unit.

SUMMARY

The present invention provides a technique for preventing unintended selection of a master unit in a technique for detecting a situation in which a plurality of master units are actually operating and eliminating coexistence of the master units.

Therefore, the present invention is directed to a communication terminal device connected to a network and performing data communications with another communication terminal device through the network.

According to an aspect of the present invention, the communication terminal device includes a storage configured to store proper information used as a criterion for switching an operation mode between a master unit operation mode and a slave unit operation mode, the proper information includes judging criterion information used as a criterion which judges a priority as a master unit of a self device; and circuitry configured to: judge, based on received information by the self device, whether or not source of the received information is the other communication terminal device; monitor whether or not the other communication terminal device is the master unit based on the judgement; acquire the judging criterion information of the other communication terminal device detected as the master unit by monitoring; and switch, while the self device is operating by the master unit operation mode and when the other master unit is detected by monitoring, the master unit operation mode of the self device to the slave unit operation mode based on the judging criterion information of the self device and the judging criterion information of the other master unit acquired. And the master unit operation mode is the operation mode of the communication terminal device operating as the master unit, and the slave unit operation mode is the operation mode of the communication terminal device operating as a slave unit.

According to another aspect of the present invention, the communication terminal device includes: a storage configured to store received information by a self device; and circuitry configured to: judge, based on the received information stored in the storage, whether or not source of the received information is the other communication terminal device; monitor, while the self device is operating by a slave unit operation mode and while first master unit in which the self device is registered is operating by a master unit operation mode, whether or not second master unit other than the first master unit exists in the other communication terminal device based on the judgement; acquire first judging criterion information used as the criterion which judges priority as the master unit of the first master unit and second judging criterion information used as the criterion which judges the priority as the master unit of the second master unit; and decide, when the second master unit is detected by monitoring, based on the first judging criterion information and the second judging criterion information, one of the first master unit and the second master unit as the master for the self device. And the master unit operation mode is the operation mode of the first master unit operating as the master unit, and the slave unit operation mode is the operation mode of the communication terminal device operating as a slave unit.

The present invention is also directed to an information communication system comprising a plurality of communication terminal devices connected to a network.

According to aspect of the present invention, the communication terminal device includes a storage configured to store proper information used as a criterion for switching an operation mode between a master unit operation mode and a slave unit operation mode, the proper information includes judging criterion information used as a criterion which judges the priority as a master unit of a self device; and circuitry configured to: judge, based on received information by the self device, whether or not source of the received information is another communication terminal device other than the self device among the plurality of the communication terminal devices; monitor whether or not the other communication terminal device is the master unit based on the judgement; acquire the judging criterion information of the other communication terminal device detected as the master unit by monitoring; and switch, while the self device is operating by the master unit operation mode and when the other master unit is detected by monitoring, the master unit operation mode of the self device to the slave unit operation mode based on the judging criterion information of the self device and the judging criterion information of the other master unit acquired. And the master unit operation mode is the operation mode of the communication terminal device operating as the master unit, and the slave unit operation mode is the operation mode of the communication terminal device operating as a slave unit.

The present invention is also directed to a non-transitory computer-readable storage medium storing computer-readable instructions.

According to aspect of the present invention, the non-transitory computer-readable storage medium storing computer-readable instructions that, when executed by a computer including storage and circuitry, cause the computer to perform a method includes: performing data communications with another communication terminal device through a network; storing proper information used as a criterion for switching an operation mode between a master unit operation mode and a slave unit operation mode, the proper information includes judging criterion information used as a criterion which judges a priority as a master unit of a self device; judging, based on received information by the self device, whether or not source of the received information is the other communication terminal device; monitoring whether or not the other communication terminal device is the master unit based on the judgement; acquiring the judging criterion information of the other communication terminal device detected as the master unit by monitoring; and switching, while the self device is operating by the master unit operation mode and when the other master unit is detected by monitoring, the master unit operation mode of the self device to the slave unit operation mode based on the judging criterion information of the self device and the judging criterion information of the other master unit acquired. And the master unit operation mode is the operation mode of the communication terminal device operating as the master unit, and the slave unit operation mode is the operation mode of the communication terminal device operating as a slave unit.

According to another aspect of the present invention, the non-transitory computer-readable storage medium storing computer-readable instructions that, when executed by a computer including storage and circuitry, cause the computer to perform a method includes: performing data communications with another communication terminal device through a network; judging, based on the received information stored in the storage, whether or not source of the received information is the other communication terminal device, monitoring, while the self device is operating by a slave unit operation mode and while first master unit in which the self device is registered is operating by a master unit operation mode, whether or not second master unit other than the first master unit exists in the other communication terminal device based on the judgement; acquiring first judging criterion information used as a criterion which judges a priority as the master unit of the first master unit and second judging criterion information used as a criterion which judges a priority as the master unit of the second master unit; and deciding, when the second master unit is detected by monitoring, based on the first judging criterion information and the second judging criterion information, one of the first master unit and the second master unit as the master unit for the self device. And the master unit operation mode is the operation mode of the communication terminal device operating as the master unit, and the slave unit operation mode is the operation mode of the communication terminal device operating as a slave unit.

The present invention is also directed to an information communication method for performing data communications between a plurality of communication terminal devices including circuitry, and having a master unit operation mode operating as a master unit and a slave unit operation mode operating as a slave unit.

According to aspect of the present invention, the information communication method includes: storing, for each of the plurality of communication terminal devices, proper information used as a criterion for switching an operation mode between the master unit operation mode and the slave unit operation mode; judging, based on received information by the communication terminal device, whether or not source of the received information is another communication terminal device other than the self device among the plurality of the communication terminal devices; monitoring, in the communication terminal device, whether or not the other communication terminal device is the master unit based on the judgement; acquiring the judging criterion information of the other communication terminal device detected as the master unit by monitoring; and switching, while the communication terminal device is operating by the master unit operation mode and when the other master unit is detected by monitoring, the master unit operation mode of the communication terminal device to the slave unit operation mode based on the judging criterion information of the communication terminal device and the judging criterion information of the other communication terminal device detected as the master unit. And the proper information includes judging criterion information used as a criterion which judges a priority as the master unit of the self device.

These and other objects, features, aspects and advantages of the present invention will become more apparent from the following detailed description of the present invention when taken in conjunction with the accompanying drawings.

DETAILED DESCRIPTION OF DISCLOSED EMBODIMENTS

Figure 1:
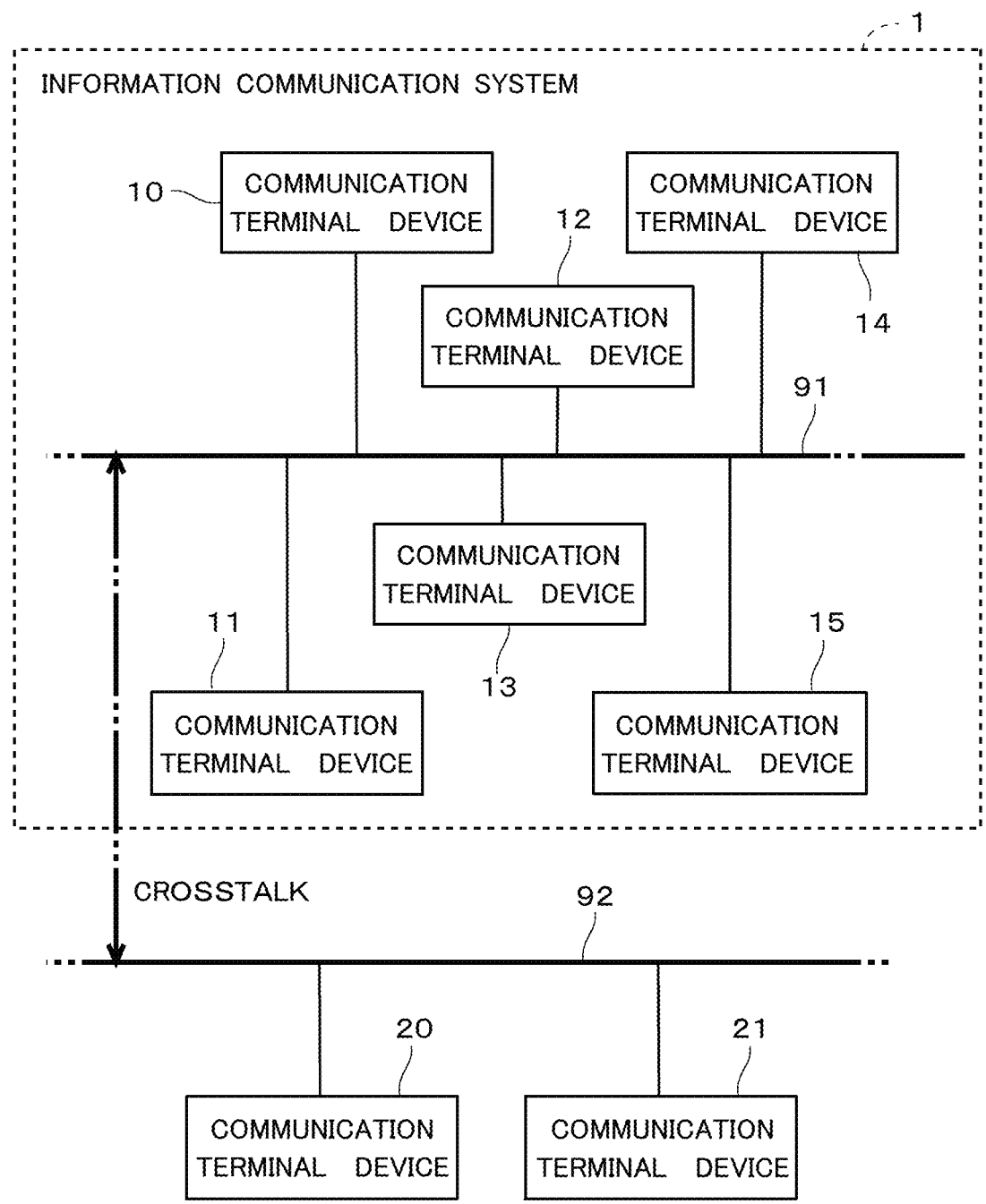
FIG. 1 is a block diagram of an information communication system in accordance with some embodiments.

One or more embodiments are described in detail below with reference to the accompanying drawings. In the following description, the descriptions related to directions and orientations correspond to those in the drawings for convenience of the description unless otherwise described, but are not intended to limit products for which the present invention is put into practice, manufactured products, or the scope of patent rights, for example.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

FIG. 1 is a block diagram of an information communication system 1 in accordance with some embodiments. The information communication system 1 includes a plurality of communication terminal devices 10, 11, 12, 13, 14, and 15 connected to a network 91.

Moreover, in FIG. 1, six sets of the communication terminal devices 10, 11, 12, 13, 14, and 15 are illustrated for example. However, the number of the communication terminal devices with which the information communication system 1 is equipped is not limited to six sets.

FIG. 1 also shows communication terminal devices 20 and 21 connected to a network 92 (different from the network 91). The communication terminal devices 20 and 21 are not devices which constitute information communication system 1. In the following description, it is assumed that the communication terminal device 20 operates as a master unit in the network 92. It is also assumed that the communication terminal device 21 operates as a slave unit in the network 92.

In some embodiments, the network 91 is PLC (Power Line Communication) network. Therefore, the network 91 is a wire communications network which used commercial power line cable. However, the network 91 is not limited to such a structure. That is, the network 91 may be the wire communications networks other than the PLC, and may be wireless communications networks. Moreover, the network 91 may be built as a communications network in which a wire communications network and a wireless communications network are intermingled.

"Crosstalk" may occur between the network 91 and the network 92 (indicated by a chain double-dashed line arrow in FIG. 1). Although details will be described later, crosstalk is unintended communication between the networks 91 and 92 configured as separate groups.

The communication terminal devices 10, 11, 12, 13, 14 and 15 are connected to the common network 91. As already described, they are forming one group. In the following description, a communication partner (not including the self device because it is a partner) within a group (within the network 91) of the information communication system 1 may be referred to as an "intra-group communication destination". For example, the intra-group communication destinations for the communication terminal device 10 are another communication terminal devices 11, 12, 13, 14, and 15. On the other hand, for the communication terminal device 10, the communication terminal device 10 (the self device) and the communication terminal devices 20 and 21, are not included in the intra-group communication destinations. Thus, the intra-group communication destinations are normal communication partners for the communication terminal devices 10, 11, 12, 13, 14, and 15.

On the other hand, in the following description, a communication partner outside the group of the information communication system 1 may be referred to as an "out-group communication destination". For example, the out-group communication destinations for the communication terminal device 10 are the communication terminal devices 20 and 21 connected to the network 92. As already explained, the communication terminal devices 10, 11, 12, 13, 14, and 15 may establish communication with the communication terminal devices 20 and 21 due to crosstalk (The communication terminal devices 20 and 21 may be communication partners of the communication terminal devices 10, 11, 12, 13, 14, and 15). Thus, the out-group communication destination is an unintended communication partner for the communication terminal devices 10, 11, 12, 13, 14, and 15.

The communication terminal devices 10, 11, and 12 included in communication terminal devices 10, 11, 12, 13, 14, and 15 have a master unit operation mode as a master unit and a slave unit operation mode as a slave unit. Therefore, the communication terminal devices 10, 11 and 12 are devices having both functions as the master unit and the slave unit. In the following description, the communication terminal devices 10, 11 and 12 are devices having the same functions and configurations. However, the communication terminal devices 10, 11 and 12 are not limited to completely the same devices.

On the other hand, the communication terminal devices 13, 14, and 15 are devices that have functions as the slave unit but do not have functions as the master unit. In the following description, the communication terminal devices 13, 14 and 15 are devices having the same functions and configurations. However, the communication terminal devices 13, 14 and 15 are not limited to completely the same devices.

In the following description, the configurations and functions of the communication terminal devices 10, 11, 12, 13, 14, and 15 will be described using the communication terminal device 10 as an example unless otherwise specified. However, as already explained, the communication terminal devices 13, 14 and 15 do not have the functions and configurations of the master unit. Therefore, in the description regarding the communication terminal device 10, the description regarding the master unit does not apply to the communication terminal devices 13, 14 and 15.

Figure 2:
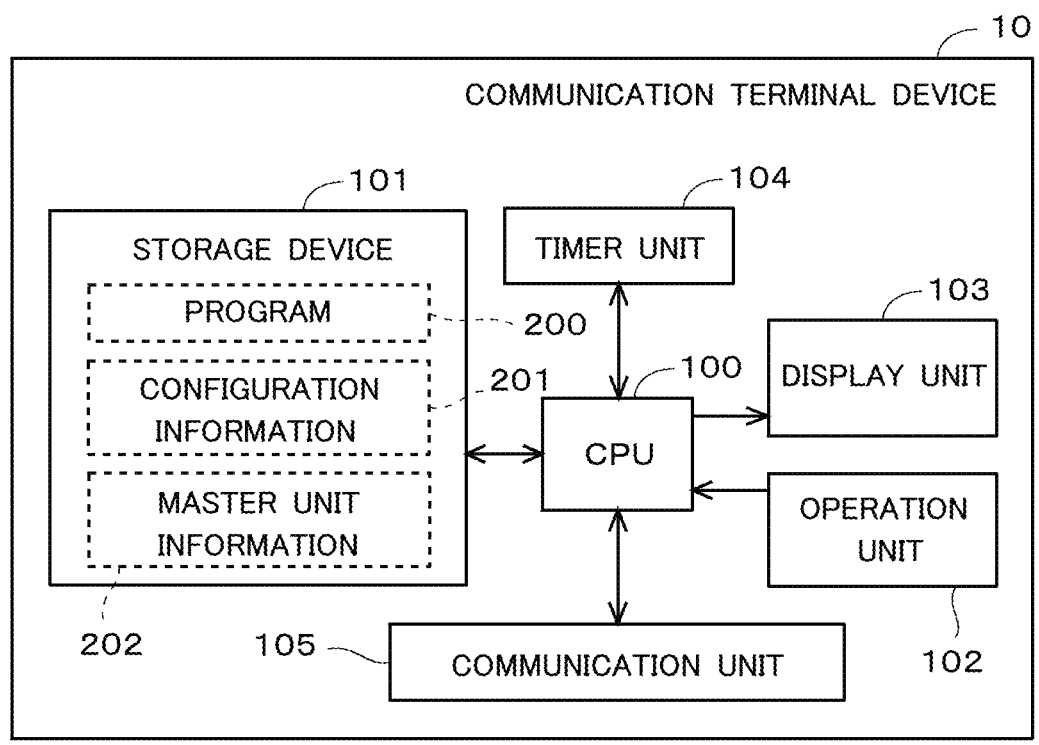
FIG. 2 is a block diagram of a communication terminal device in accordance with some embodiments.

FIG. 2 is a block diagram of the communication terminal device 10 in accordance with some embodiments. The communication terminal device 10 includes a CPU 100 and a storage device 101.

The CPU 100 executes a program 200 stored in the storage device 101 while reading it, and calculates various types of data and generates a control signal, for example. Thus, the CPU 100 has a function of controlling respective components included in the communication terminal device 10 and calculating and generating various types of data. That is, the communication terminal device 10 is configured as a general computer.

The storage device 101 provides a function of storing various types of data in the communication terminal device 10. In other words, the storage device 101 stores electronically fixed information in the communication terminal device 10.

As the storage device 101, a RAM and a buffer used as a temporal working area of the CPU 100, a read-only ROM, a non-transitory memory (e.g., a NAND memory), a hard disk storing a relatively large amount of data, a portable recording medium (e.g., a CD-ROM, a DVD-ROM, a PC card, an SD card, a USB memory) mounted onto a dedicated reader device can be considered, for example. In FIG. 2, the storage device 101 is shown as if it formed a single structure. However, the storage device 101 is usually formed by more than one of the above listed various types of devices (or medium), which are employed as necessary. That is, in some embodiments, the storage device 101 is a general term referring to devices each having a function of storing data.

The actual CPU 100 is an electronic circuit including therein a RAM that allows a high-speed access thereto. Such a storage device included in the CPU 100 is described as being also included in the storage device 101 for convenience of the description. That is, in accordance with some embodiments, it is described that data temporarily stored by the CPU 100 itself is also stored in the storage device 101. As shown in FIG. 2, the storage device 101 is used for storing the program 200, configuration information 201 and master unit information 202. However, the information stored in the storage device 101 is not limited to these.

The configuration information 201 is information which shows various kinds of set situations in the communication terminal device 10. The configuration information 201 is stored in the non-transitory storage media which constitute the storage device 101. Therefore, the contents are not lost even if the configuration information 201 is a case where the power supply of the communication terminal device 10 is turned OFF. In addition, information included in the configuration information 201 is mentioned later.

The master unit information 202 is the information about the master unit (the self device can also be included) which exists on the network 91. In the technology of the PLC, the communication terminal device 10 which received information can acquire various additional information included in the received information. The additional information can consider addressee, sender, forwarding, transfer source, information about transmitting time, the number of times of hop, or communication quality, for example. However, the additional information is not limited to the information on the contents described here.

Although the details will be described later, based on the acquired additional information, the communication terminal device 10 checks the existence of each communication terminal device 10, 11, 12, 13, 14, and 15 and the various states of them, on the network 91. For example, the communication terminal device 10 detects the master unit other than itself according to the acquired additional information. And the communication terminal device 10 makes the additional information into the master unit information 202 suitably. That is, the communication terminal device 10 edits the additional information, and generates the master unit information 202. Furthermore, based on the additional information, the communication terminal device 10 communicates positively with the detected master unit, collects the required information (It is not the additional information) about the master unit, and also makes the collected information into the master unit information 202.

Further, the communication terminal device 10 stores information about itself in the master unit information 202 when itself is the master unit. Therefore, the master unit information 202 may include information other than information which received by the communication terminal device 10.

For example, since the communication terminal device 13 that is the dedicated slave unit is not the master unit, in principle, information about the communication terminal device 13 is not included in the master unit information 202. However, for example, when the communication terminal device 10 is the master unit, the master unit information 202 may include information about the communication terminal device 13 as the slave unit registered to the communication terminal device 10 (the master unit). Thus, indirectly, information about the communication terminal device 13 that is the slave unit may be included in the master unit information 202.

Furthermore, when crosstalk occurs, the communication terminal device 10 may receive information from the out-group communication destination. Therefore, information about the communication terminal devices 20 that is the master unit on the network 92 may be included in the master unit information 202.

As shown in FIG. 2, the communication terminal device 10 further includes an operation unit 102, a display unit 103, a timer unit 104, and a communication unit 105.

The operation unit 102 is hardware operable by an operator for giving an instruction to the communication terminal device 10. As the operation unit 102, various keys, buttons, switches, a touch panel, pointing devices, jog dials, and the like are considered.

The display unit 103 is hardware having a function of displaying various kinds of information to the operator to provide the information. As the display unit 103, a lamp, an LED, a liquid crystal display, a liquid crystal panel, and the like are considered.

The timer unit 104 is an electronic circuit which has a function which measures time. The timer unit 104 transmits an interrupt signal to the CPU 100 when the time which has been set by the CPU 100 passes. For example, the timer unit 104 in the communication terminal device 10 is used in order to measure the search lapsed time (describe later) etc. In the following description, when the search lapsed time passes, the interrupt signal which is transmitted towards the CPU 100 from the timer unit 104 is called a "time out signal".

The communication unit 105 has the function of connecting the communication terminal device 10 to the network 91, in the state in which data communications are possible. As described above, the network 91 in some embodiments is the PLC network. Therefore, the communication unit 105 is an electronic circuit (a PLC module) to accomplish the PLC function.

Figure 3:
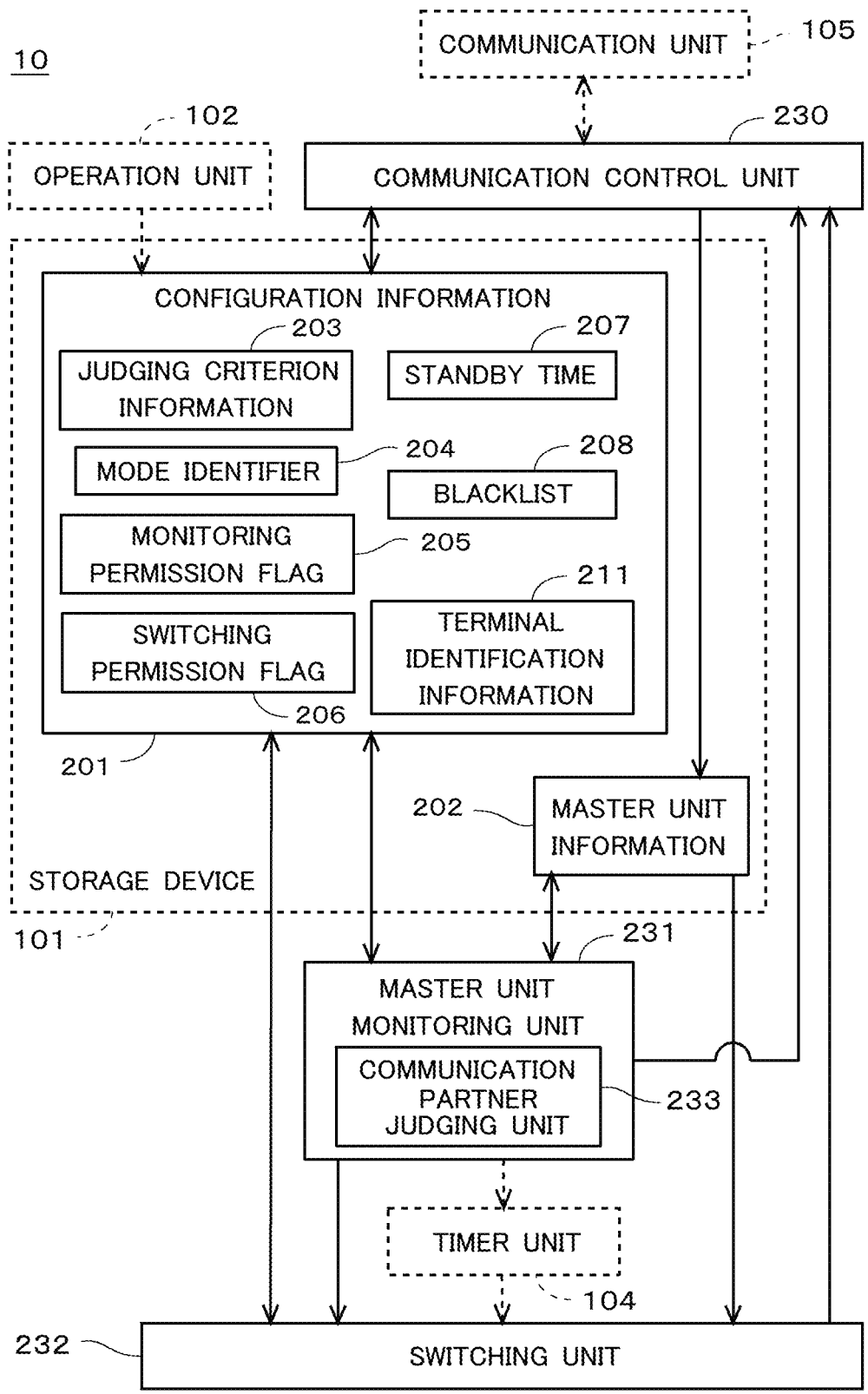
FIG. 3 is a block diagram of functional blocks included in the communication terminal device in accordance with an embodiment, with a data flow.

FIG. 3 is a block diagram of functional blocks included in the communication terminal device 10 in accordance with this embodiment, with a data flow. A communication control unit 230, a master unit monitoring unit 231, a switching unit 232, and a communication partner judging unit 233, that are shown in FIG. 3 are the functional blocks achieved by the operation of the CPU 100 in accordance with the program 200. In addition, the master unit monitoring unit 231 in some embodiments has the communication partner judging unit 233, as shown in FIG. 3. However, the configuration is not limited to the configuration in which the master unit monitoring unit 231 has the communication partner judging unit 233. The judgement result by the communication partner judging unit 233 may be configured to be transmitted to the master unit monitoring unit 231 that does not have the communication partner judging unit 233.

As shown in FIG. 3, the configuration information 201 includes a judging criterion information 203, a mode identifier 204, a monitoring permission flag 205, a switching permission flag 206, a standby time 207, a blacklist 208, and a terminal identification information 211.

The judging criterion information 203 is information indicating MAC address assigned to the self device in advance. The MAC address is information that is uniquely assigned to the communication terminal devices 10, 11, 12, 13, 14, and 15. Therefore, the MAC address is identification information for individually identifying the communication terminal devices 10, 11, 12, 13, 14, and 15.

Although the details will be described later, in the information communication system 1 according to some embodiments, the order of priority as the master unit is determined according to the magnitude relation of the MAC addresses of the plurality of the communication terminal devices 10, 11, and 12. That is, in the communication terminal devices 10, 11, and 12 having the function of being the master unit, the judging criterion information 203 is not only identification information for identifying itself. The judging criterion information 203 is also information which serves as a reference for judging the priority of the self device as the master unit among the plurality of the communication terminal devices 10, 11, and 12.

Unlike the communication terminal devices 10, 11, and 12, the communication terminal devices 13, 14 and 15 never become the master unit. Therefore, the communication terminal devices 13, 14, and 15 do not need the judging criterion information 203 as information for judging the priority order of their self device as the master unit. However, the judging criterion information 203 in this embodiment is the MAC address assigned to the device itself. Therefore, the judging criterion information 203 is also stored in the communication terminal devices 13, 14, and 15 (further the communication terminal devices 20 and 21).

The mode identifier 204 is information which indicates whether the self device starts by the slave unit operation mode or by the master unit operation mode, at the time of a reboot. Although the details will be described later, when the operation mode in the communication terminal device 10 has been switched between "the master unit operation mode" and "the slave unit operation mode", the communication terminal device 10 is certainly rebooted promptly. Therefore, while the communication terminal device 10 is operating, the present operation mode and the operation mode indicated in the mode identifier 204 are almost always in agreement.

That is, in the communication terminal device 10, the present operation mode can be checked by referring to the mode identifier 204 which is contained in the configuration information 201. In the following explanation, which the mode identifier 204 is "1", it means that the communication terminal device 10 starts with the slave unit. On the other hand, when the mode identifier 204 is "0", it means that the communication terminal device 10 is started with the master unit. Moreover, the initial value of the mode identifier 204 is set to "1 (the slave unit operation mode)".

Since the communication terminal devices 13, 14, and 15 do not have the master unit operation mode, there is no situation to start in the master unit operation mode when they are restarted. That is, the communication terminal devices 13, 14, and 15 do not need to identify the operation mode. Therefore, the mode identifier 204 may not be stored in the communication terminal devices 13, 14, and 15. For example, when the mode identifier 204 does not exist, the information communication system 1 may perform the same operation as when the mode identifier 204 is "1". However, the communication terminal devices 13, 14, and 15 in some embodiments have the mode identifier 204, and the mode identifier 204 is fixed to "1".

The monitoring permission flag 205 is information which indicates whether monitoring by the master unit monitoring unit 231 (describe later) is permitted or not. In the following explanation, when the monitoring permission flag 205 is "1", it means being invalidity (not admit). On the other hand, when the monitoring permission flag 205 is "0", it means being valid (admit). Moreover, the initial value of the monitoring permission flag 205 is set to "1 (not admit)".

The switching permission flag 206 is information which indicates whether switching the operation mode is permitted or not. In the following explanation, when the switching permission flag 206 is "1", it means being invalidity (not admit). On the other hand, when the switching permission flag 206 is "0", it means being valid (admit). Moreover, the initial value of the switching permission flag 206 is set to "1 (not admit)".

The communication terminal devices 13, 14, and 15 do not have the master unit operation mode, and operate only in the slave unit operation mode. That is, it is not occurred that the operation mode of the communication terminal devices 13, 14, and 15 are switched. Therefore, the communication terminal devices 13, 14, and 15 do not have to store the switching permission flag 206. However, the communication terminal devices 13, 14, and 15 in this embodiment have the switching permission flag 206, and the switching permission flag 206 is fixed at "1".

In addition, when the monitoring permission flag 205 is "0", the information communication system 1 in accordance with some embodiments performs processing regardless of the value of the switching permission flag 206 as what the switching to the slave unit operation mode from the master unit operation mode is permitted. However, it is possible that the propriety of the switching to the slave unit operation mode from the master unit operation mode is judged according to the switching permission flag 206 (or separately independent flag).

When the communication terminal device 10 is performing the slave unit operation mode, and the master unit for the self device has not been decided, the communication terminal device 10 starts searching the master unit. The standby time 207 is information which indicates time the communication terminal device 10 should be waiting until the master unit is actually found. The standby time 207 is set to the timer unit 104 by the CPU 100 (the master unit monitoring unit 231). In order that the timer unit 104 determines the timing which generates the time out signal, the standby time 207 which has been set to the timer unit 104 is used. Although the details will be described later, when search of the master unit has been started, the communication terminal device 10 is waiting until the standby time 207 which has been set in the configuration information 201 has passed. When the standby time 207 has passed without discovering the master unit, the communication terminal device 10 abandons search of the master unit.

The blacklist 208 is the information which recorded the device which the communication terminal device 10 does not accept as the master unit. When the communication terminal device 10 determines the master unit for the self device, the communication terminal device 10 refers to the blacklist 208. And the communication terminal device 10 refuses to register the device currently recorded on the blacklist 208 as the master unit.

In this embodiment, the terminal identification information 211 is information storing identification information (information for individually identifying the plurality of communication terminal devices 10, 11, 12, 13, 14, and 15) for six devices. That is, the terminal identification information 211 is list information of members (communication terminal devices 10, 11, 12, 13, 14, and 15) provided in the information communication system 1. However, the terminal identification information 211 does not have to include its own identification information. That is, the terminal identification information 211 may be identification information of the intra-group communication destinations (not including itself).

In some embodiments, the MAC addresses uniquely assigned to the communication terminal devices 10, 11, 12, 13, 14, and 15 are used as identification information. Therefore, the terminal identification information 211 stores the MAC addresses of the plurality of communication terminal devices 10, 11, 12, 13, 14, and 15. Although the details will be described later, the communication terminal devices 10, 11, 12, 13, 14, and 15 collate the MAC address indicating communication partner (communication destination) with the terminal identification information 211. This makes it possible to determine whether or not the communication partner is a member of the same network 91 as the self device.

The MAC addresses of devices that may become members in the future may be stored in the terminal identification information 211 in advance. In that case, the number of the MAC addresses included in the terminal identification information 211 will be more than six.

The communication control unit 230 shown in FIG. 3 controls the communication unit 105. That is, the communication control unit 230 realizes the PLC (data communications) between the communication terminal device 10 and the devices which are connected to the network 91.

The communication control unit 230 specifies the information and addressee which are stored in the storage device 101, and makes the communication unit 105 transmit that information.

Moreover, the communication control unit 230 stores in the storage device 101 the information received by the communication unit 105. For example, when the information (for example, Hello packet) transmitted from master units other than the self device in order to tell the existence has been received by the communication unit 105, the communication control unit 230 creates (or updates) in the storage device 101 the master unit information 202 based on the received information.

Further, in the communication unit 105, communication may be established with the out-group communication destinations due to crosstalk. If the received information includes information about the master unit, the communication control section 230 generates the master unit information 202 based on the received information, even if the received information is due to crosstalk.

The communication control unit 230 refers to the mode identifier 204 of the configuration information 201, and realizes processing (hereinafter, referred to as a "slave unit processing") as the slave unit in the PLC, when the mode identifier 204 is "1". On the other hand, the communication control unit 230 realizes processing (hereinafter, referred to as a "master unit processing") as the master unit in the PLC, when the mode identifier 204 is "0". Since each of the slave unit processing and the master unit processing can apply the known technology for example, detailed explanation is omitted here.

Furthermore, according to the transmitted signal (hereinafter, referred to as a "master unit switching signal") from the switching unit 232, the communication control unit 230 makes the communication unit 105 perform communications (transmission and reception) of packets required in order to change the master unit in which the self device is registered at the time. In addition, when the master unit switching signal is transmitted and the self device is the master unit, the communication control unit 230 makes the communication unit 105 perform communications of packets required in order to switch the self device to the slave unit from the master unit.

The master unit monitoring unit 231 has a function of monitoring whether or not the intra-group communication destinations (another communication terminal devices) is the master unit. In order for the master unit monitoring unit 231 to monitor a presence of the master unit on the network 91, an operation of searching for the presence of the master unit on the network 91 is involved.

The function to search existence of the master unit (device which can switch as the master unit) at the time of starting of wireless LAN device (communication terminal device) etc., as the technology to approximate to the function which the master unit monitoring unit 231 realizes is proposed in the Japanese Unexamined Patent Application Publication No. 2011-135608 for example. The master unit monitoring unit 231 can adopt such known technology, and can realize the principle which searches existence of the master unit on the network 91.

However, such known technology is the technology which searches for the master unit when a possibility that a communication terminal device is not able to establish communication of the self device is a high situation (or a situation which actually cannot establish). That is, such technology is the processing which is carried out in what is called an "emergency". When communication has already been established and the data communications are stabilizing, the processing of such known technology is not carried out.

On the other hand, the monitoring of the master unit by the master unit monitoring unit 231 is carried out continuously at "normal situation", not only "emergency situation". That is, search of the master unit by the master unit monitoring unit 231 is also performed in "normal situation". "Normal situation" is the time when the communication terminal device 10 is operating normally as the master unit, or the time when the master unit for the communication terminal device 10 is already checked, etc. That is, "normal situation" is the time when the communication terminal device 10 has already been performing normal data communications.

The master unit monitoring unit 231 uses the communication partner judging unit 233 to judge whether or not the source of the received information is another communication terminal device (intra-group communication destination) based on the information received by itself.

Specifically, the master unit monitoring unit 231 judges whether information received by the self device is included in the master unit information 202. The information received by the self device is information transmitted by the communication terminal device other than the self device (intra-group communication destination or out-group communication destination). A case where such information is included in the master unit information 202 indicates that the communication terminal device other than the self device exists as the master unit.

Therefore, when the information received by the self device is included in the master unit information 202, the communication partner judging unit 233 refers to the received information and acquires the identification information indicating the source of the received information. Furthermore, when the acquired identification information is included in the terminal identification information 211, the communication partner judging unit 233 judges that the source of the received information is the intra-group communication destination. When the information received from the intra-group communication destination is included in the master unit information 202, the master unit monitoring unit 231 recognizes the master unit indicated in the information received from the intra-group communication destination as the master unit. In this case, the master unit monitoring unit 231 judges that the intra-group communication destination (another communication terminal device) is the master unit.

On the other hand, when the acquired identification information is not included in the terminal identification information 211, the communication partner judging unit 233 judges that the source of the received information is the out-group communication destination. There is a high probability that the master unit indicated in the information received from the out-group communication destination is the out-group communication destination. For example, the master unit (the communication terminal device 20) indicated in the information received from the communication terminal device 21 is the out-group communication destination. Therefore, even if the information received from the out-group communication destination is included in the master unit information 202, the master unit monitoring unit 231 ignores the master unit which is indicated in the information received from the out-group communication destination without judging it as the master unit. The master unit monitoring unit 231 registers in the blacklist 208 the master unit indicated in the information received from the out-group communication destination. At this time, the master unit monitoring unit 231 may delete the information received from the out-group communication destination from the master unit information 202.

Further, the master unit monitoring unit 231 detects whether or not there are the plurality of master units by monitoring whether or not the intra-group communication destination is the master unit. Then, when the presence of a plurality of master units is detected, the master unit monitoring unit 231 transmits a signal (hereinafter, referred to as a "coexistence detection signal") to that effect to the switching unit 232. Here, when the communication terminal device 10 is operating in the master unit operation mode, "the case of detecting existence of two or more master units" is the case of detecting existence of master units other than the self device. On the other hand, when the communication terminal device 10 is the slave unit operation mode, "the case of detecting existence of two or more master units" is the case of detecting existence of master units other than which the self device is registered (or when a plurality of intra-group communication destinations is detected as the master unit).

In addition, the master unit monitoring unit 231 in some embodiments performs the monitoring at normal situation only when the monitoring permission flag 205 included in the configuration information 201 is "0 (permit)".

Moreover, the master unit monitoring unit 231 has a function to set the standby time 207 to the timer unit 104 to make search lapsed time measure, and a function which resets the set standby time 207.

The switching unit 232 has a function which switches the operation mode of the communication terminal device 10 between the master unit operation mode and the slave unit operation mode. The master unit operation mode is the operation mode which the communication terminal device 10 operates as the master unit. And the slave unit operation mode is the operation mode which the communication terminal device 10 operates as the slave unit. Moreover, the switching unit 232 provides a function of switching the master unit in which the self device is registered to another master unit w % ben the communication terminal device 10 is operating in the slave unit operation mode. That is, the switching unit 232 has an operation mode switching function and a master unit switching function for the slave unit.

While the self device is operating by the master unit operation mode and when the master unit monitoring unit 231 detects existence of master unit other than the self device, the switching unit 232 switches the master unit operation mode of the self device to the slave unit operation mode, based on the judging criterion information 203 on the self device and the judging criterion information 203 on master unit other than the self device. More specifically, while operating by the master unit operation mode and when the coexistence detection signal has been transmitted to the switching unit 232, the switching unit 232 acquires the judging criterion information 203 (MAC address) of the detected master unit, from the master unit information 202. The switching unit 232 compares the acquired judging criterion information 203 with the judging criterion information 203 (MAC address) of the self device. When the self device has a low priority as the master unit, the switching unit 232 switches the operation mode of the self device to the slave unit operation mode.

When switching the self device to the slave unit operation mode, the switching unit 232 rewrites the mode identifier 204 of the configuration information 201 to "1". And the switching unit 232 reboots the communication terminal device 10 (self device) promptly.

Moreover, when the time out signal has been transferred from the timer unit 104, the switching unit 232 rewrites the mode identifier 204 to "0", and reboots the communication terminal device 10 (self device) promptly. Thus, the switching unit 232 changes the operation mode of the communication terminal device 10 to the master unit operation mode, when the search lapsed time exceeds the standby time 207.

However, since the switching unit 232 in the communication terminal devices 13, 14, and 15 dedicated to the slave unit does not operate in the master unit operation mode. Therefore, the communication terminal devices 13, 14, and 15 do not have such an operation mode switching function. In other words, the function of switching the operation mode between the master unit operation mode and the slave unit operation mode is a function provided by the switching unit 232 in the communication terminal devices 10, 11, and 12.

Moreover, while operating by slave unit operation mode and when the coexistence detection signal has been transmitted, the switching unit 232 acquires the judging criterion information 203 (MAC address) of the detected master unit, and the judging criterion information 203 (MAC address) of the master unit in which the self device has been registered, from the master unit information 202, and compares them. As a result of comparing, when the master unit in which the self device has been registered has a low priority as the master unit, the switching unit 232 transmits the master unit switching signal to the communication control unit 230. In addition, the switching unit 232 registers into the blacklist 208 the master unit in which the self device has been registered, when generating the master unit change signal.

The above is the description of the structure and functions of the information communication system 1. Next, an information communication method by the information communication system 1 is described.

Figure 4:
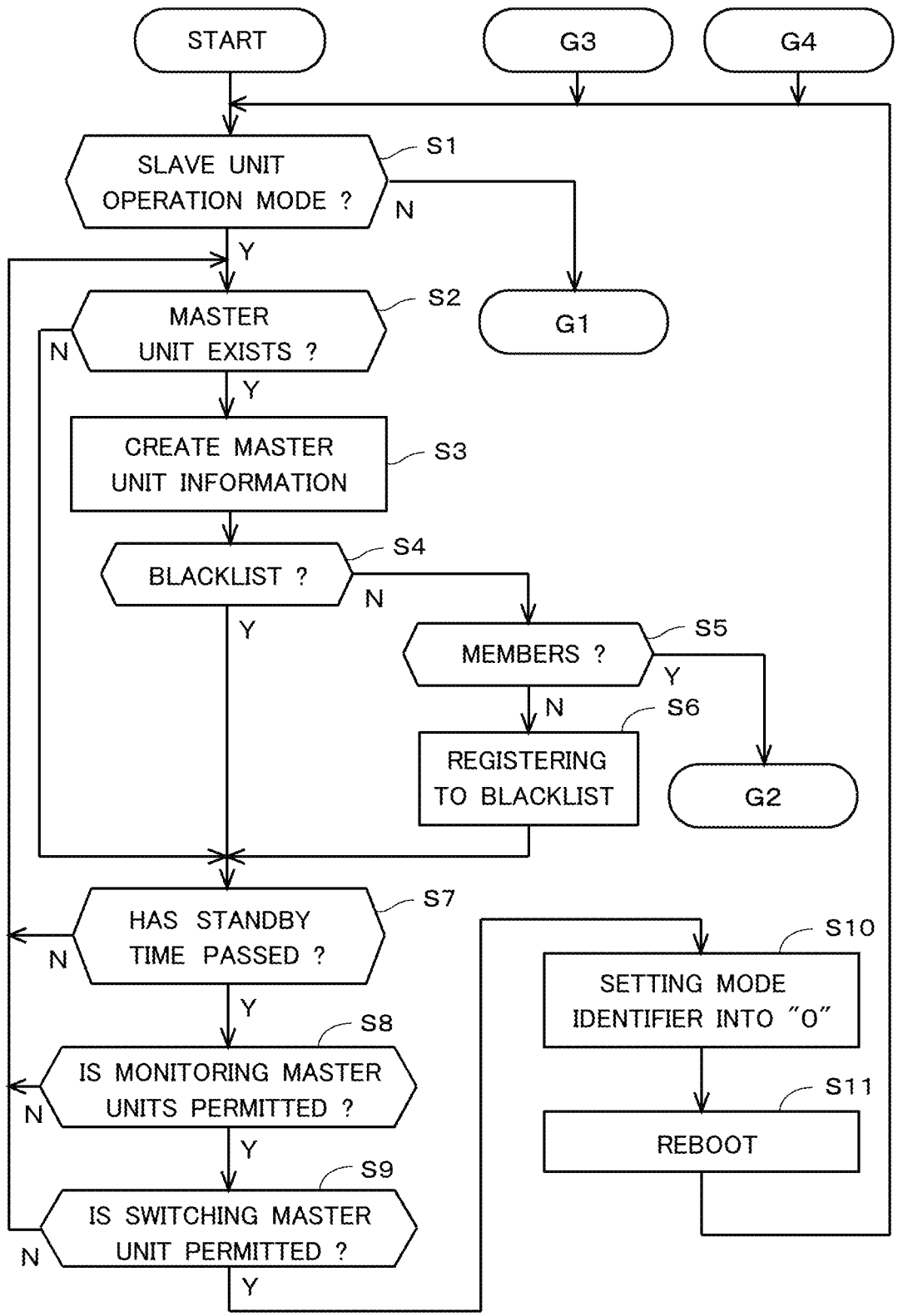
FIG. 4 is a flow chart showing information communication method executing by the information communication system.
Figure 5:
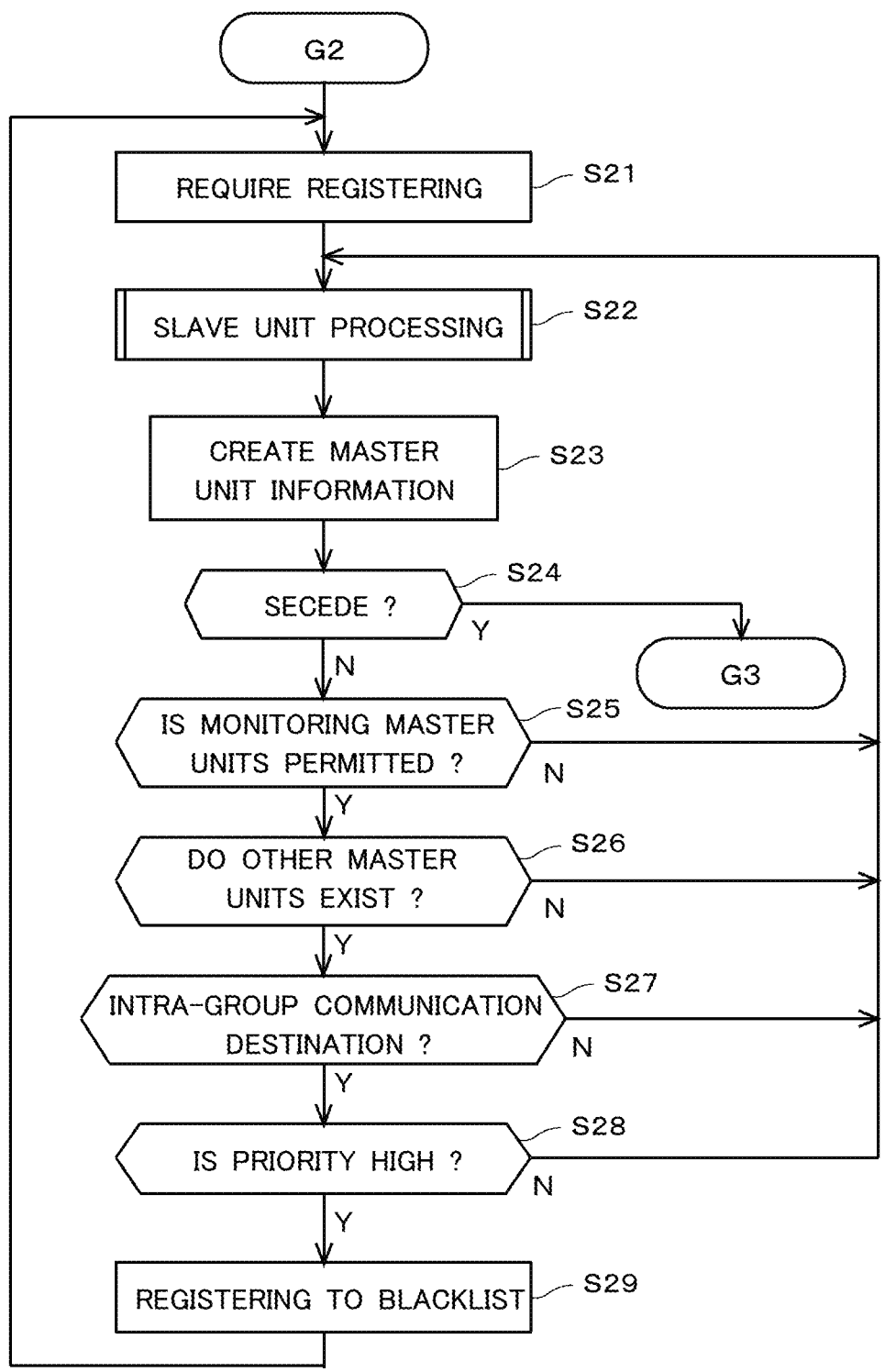
FIG. 5 is a flow chart showing information communication method executing by the information communication system.
Figure 6:
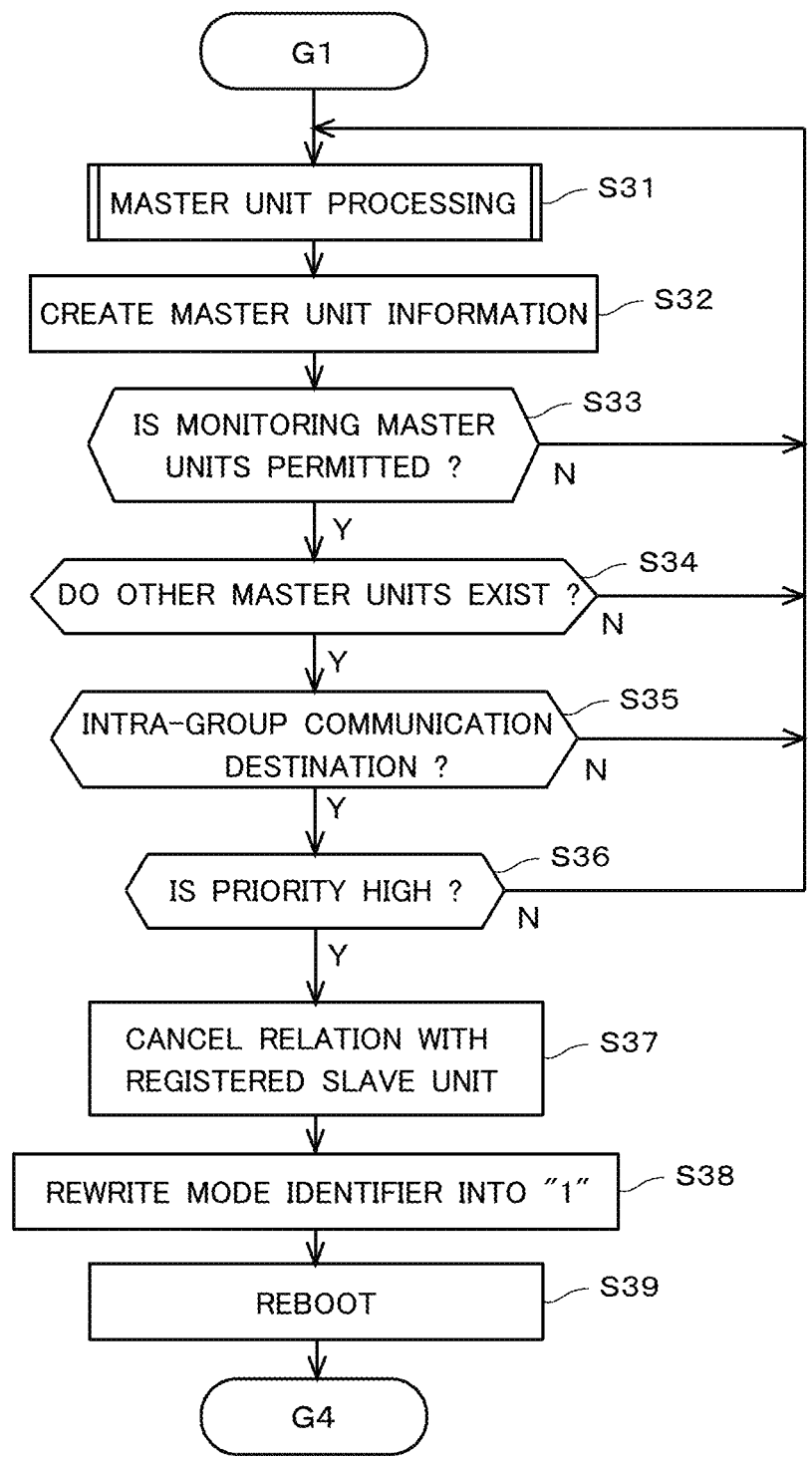
FIG. 6 is a flow chart showing information communication method executing by the information communication system.

FIGS. 4 to 6 are flowcharts showing the information communication method executing by the information communication system 1. Before the processing shown in FIGS. 4 to 6 are started, the step of generating the configuration information 201 necessary for each of the communication terminal devices 10, 11, 12, 13, 14, and 15, and storing in each storage device 101 has already been completed. Moreover, the initial value of the monitoring permission flag 205 of the configuration information 201 in each communication terminal device 10, 11, 12, 13, 14, and 15 and the switching permission flag 206 have been rewritten by the construction person in charge.

When the processing shown in FIG. 4 is started, the CPUs 100 of the communication terminal devices 10, 11, 12, 13, 14, and 15 refer to the mode identifier 204, and judge whether or not to start by slave unit operation mode (Step S1). The judgment in Step S1 is made based on whether the value of the mode identifier 204 is "1" or not. Since the mode identifiers 204 of the communication terminal devices 13, 14 and 15 are fixed to "1", the CPUs 100 of the communication terminal devices 13, 14 and 15 always determine "Yes" in Step S1.

Because the mode identifier 204 is "0", when not starting by the slave unit operation mode (No in Step S1), the communication terminal device 10 is started by the master unit operation mode. The communication terminal device 10 started by the master unit operation mode performs the processing shown in FIG. 6, but details are described later.

Because the mode identifier 204 is "1", when starting by the slave unit operation mode (Yes in Step S1), the communication terminal device 10 is started by the slave unit operation mode.

When the communication terminal device 10 is started by the slave unit operation mode, the communication terminal device 10 needs to find the master unit on the network 91. Therefore, when the judgment in Step S1 is Yes, the master unit monitoring unit 231 sets the standby time 207 to the timer unit 104, and makes the timer unit 104 start measurement of the search lapsed time. Thereby, when the set standby time 207 has passed, in the timing, the timer unit 104 transmits the time out signal to the switching unit 232.

When the judgment in Step S1 is Yes, the communication control unit 230 judges whether the master unit exists by referring the information acquired by the communication unit 105 (Step S2). For example, since the known technology can be used, detailed description about the search procedure of the master unit in Step S2 (at the time of starting) is omitted. However, the master unit whose existence is confirmed in Step S2 is not limited to the intra-group communication destination, and may be the out-group communication destination.

When existence of the master unit cannot be checked (No in Step S2), the switching unit 232 judges whether the standby time 207 (search lapsed time) has passed by the existence of transfer of the time out signal from the timer unit 104 (Step S7).

The time out signal is not transmitted when the standby time 207 has not passed. Therefore, the switching unit 232 judges to be No in Step S7. In the case, the CPU 100 returns to the process of Step S2 and repeats processing. That is, by performing Step S7, the communication terminal devices 10, 11, 12 started by the slave unit operation mode do not switch to the master unit operation mode until the standby time 207 has passed.

As described above, in the communication terminal devices 10, 11, 12, 13, 14, and 15 in some embodiments, the standby time 207 is the sum of a fixed value (common value) and the MAC address of the self device. Therefore, the standby time 207 is set to become a peculiar value of the self device. That is, the timing becoming time out (state where the time which is standby for searching the master unit exceeds the standby time 207) of the search lapsed time in Step S7 differs in each communication terminal device 10, 11, 12, 13, 14, and 15. Therefore, a power supply is supplied to the information communication system 1, and even if each communication terminal device 10, 11, 12, 13, 14, and 15 is started at almost simultaneous timing, it is expected that the timings at which the judgement in Step S7 becomes "Yes" do not match.

Thereby, when the master unit does not exist on the network 91 (for example, initial state at the time of installation), even if the plurality of communication terminal devices 10, 11, and 12 start simultaneously, what has the smallest value of the standby time 207 switches to the master unit operation mode first. When at least one of the communication terminal devices 10, 11, and 12 changes to the master unit, in other device, the judgment in Step S7 is not switched to "Yes" henceforth (the judgment in Step S2 is switched to "Yes"). Therefore, the information communication system 1 can suppress that the communication terminal devices 10, 11, and 12 are switched to the master unit simultaneously, compared with the case where measures are not taken at all like the known technology.

In some embodiments, what has the smallest value of the standby time 217 (what changes to the master unit operation mode first) has the smallest value of the MAC address. And what has the smallest value of the MAC address has the highest priority as the master unit in the information communication system 1 in some embodiments. Thus, if it is set so that what has a high priority as the master unit switches as the master unit earlier, it can also suppress the switch frequency of the master unit in later processing.

It is already described that the standby time 207 in some embodiments is the sum of the fixed value (common value) and the MAC address of the self device. On the other hand, the MAC address of the self device is stored in the configuration information 201 as the judging criterion information 203. Therefore, it is possible to store a common fixed value as the standby time 207. In this case, the master unit monitoring unit 231 may be configured to set the sum of the fixed standby time 207 and the self device's MAC address indicated in the judging criterion information 203 to the timer unit 104.

When the standby time 207 has already passed (Yes in Step S7), the switching unit 232 judges whether or not monitoring master units other than the self device is permitted (Step S8). Step S8 is realized that the switching unit 232 refers to the monitoring permission flag 205 and judges whether or not the monitoring permission flag 205 is "0".

When the monitoring permission flag 205 is "1" (No in Step S8), the communication terminal devices 10, 11, and 12 (the CPU 100) return to the processing from Step S2. In this case, even if they are the communication terminal devices 10, 11, and 12, the switching unit 232 does not switch the operation mode to the "master unit operation mode".

The communication terminal device 10, 11, and 12 which has the function of master unit has the function which monitors existence of master units other than the self device, when the self device operates with the master unit operation mode. As result of monitoring, when the device in which the priority as the master unit is higher than the self device has been detected as the master unit, in order to cancel coexistence of master units, the communication terminal device 10, 11, and 12 switches the operation mode to the slave unit operation mode.

However, if the communication terminal device 10, 11, and 12 to which the function which monitors existence of master units other than the self device is not permitted has been switched to the master unit operation mode, naturally this communication terminal device 10, 11, and 12 cannot monitor existence of master units other than the self device. Even if a plurality of master units have been in an existence state, the communication terminal device 10, 11, and 12 which cannot detect coexistence of master units cannot shift to the slave unit operation mode. Therefore, when the function which monitors existence of master units other than the self device is not permitted by Step S8, the communication terminal device 10, 11, and 12 is restricted so that self device may not shift to the master unit operation mode.

Thereby, the information communication system 1 can prevent disorderly increasing of master units on the network 91. In addition, instead of providing the judgment of Step S8, when switching to the master unit operation mode, the process of rewriting the value of the monitoring permission flag 205 to "0" may be provided additionally. In this case, the situation which the master units increase temporarily for a certain reason may arise. However, since the low priority communication terminal device 10, 11, and 12 switches to the slave unit operation mode automatically with progress of time, the state where the plurality of master units exist is canceled.

When the monitoring permission flag 205 is "0" (Yes in Step S8), the switching unit 232 judges further whether the switching of operation mode is permitted (Step S9). Step S9 is realized that the switching unit 232 refers to the switching permission flag 206 and judges whether or not the switching permission flag 206 is "0".

When the switching permission flag 206 is "1" (No in Step S9), the communication terminal device 10 (the CPU 100) returns to the processing from Step S2. In this case, even if they are the communication terminal devices 10, 11, and 12, the switching unit 232 does not switch the operation mode to the "master unit operation mode".

Thus, in the information communication system 1, by using the switching permission flag 206, it is possible to set in advance whether or not the operation mode can be switched for each of the communication terminal devices 10, 11, 12, 13, 14, and 15. And when the switching unit 232 checks this setting (the switching permission flag 206) suitably, it can be suppressed the disorderly switching of the operation mode of the communication terminal devices 10, 11, 12, 13, 14, and 15.

According to the past description, the following things are understood. When all the communication terminal devices 10, 11, and 12 are installed in the state in which both of the monitoring permission flag 205 and the switching permission flag 206 are initial values ("1"), the communication terminal device 10, 11, and 12 which transitions to the master unit operation mode never appears. Therefore, when installing the information communication system 1, the construction person in charge needs to choose at least one of the communication terminal devices 10, 11, and 12 and needs to change the value of the monitoring permission flag 205 and the switching permission flag 206 into "0".

For example, such work (change the values into "0") is possible when the construction person in charge operates the operation unit 102 of the communication terminal device 10, 11, and 12. That is, the information communication system 1 requires a setup by the construction person in charge at the time of installation. At first glance, this imposes a burden on the construction person in charge.

Here, the point which both sets the initial value of the monitoring permission flag 205 and the switching permission flag 206 to "1 (disapproval)" is explained.

When the monitoring permission flag 205 is set to "0 (permit)", even when the network is operating normally, the process of monitoring the coexistence state of the master unit is frequently occurred (this process is also performed on the slave unit). In this case, overhead increases. Therefore, it is preferable that the number of devices whose monitoring permission flag 205 is set to "0" is as small as possible.

Moreover, the information communication system 1 is designed to constitute one network. Therefore, in a normal state, the number of the master units is wanted to be one. In spite of it, when it is admitted that all the communication terminal devices 10, 11, and 12 operate as the master unit, as the number of permitted devices (parent device candidates) increases, there is a risk that a situation in which the master unit coexists will become more likely to occur. Even if the narrowing down to one master unit is automatically executed, normal data communication cannot be performed during that period, which is not preferable.

Moreover, in the situation where all the communication terminal devices 10, 11, and 12 can switch as the master unit, even if it is finally narrowed down to one device, there is a problem that the final master unit is indefinite. In the information communication system 1, when the device which is not designed becomes the master unit, there is a possibility that the performance which has been planned at the beginning may not be realized.

Furthermore, the information communication system 1 in some embodiments assumes the business use system installed in an office building etc. It is accompanied by comparatively large-scale construction to install such an information communication system 1. Therefore, those who perform such installation are not a general user but construction persons in charge who usually have special knowledge. That is, it is assumed that the construction person in charge who is a specialist attends at installation of the information communication system 1. Therefore, even if such work (setting work for at least one of the communication terminal devices 10, 11, and 12) is assigned to the construction person in charge, the burden is not heavier than a general user assigned the same work.

Therefore, as described above, in the communication terminal devices 10, 11, and 12 of the information communication system 1 in some embodiments, the initial values of the monitoring permission flag 205 and the switching permission flag 206 have been both set to "1 (disapproval)". And, the information communication system 1 is constituted so that the construction person in charge should perform the setup at the time of installation. As already described above, the setup has already been ended by the time the processes shown in FIGS. 4 to 6 are started.

However, it is possible to consider that the purpose of easing burden of the construction person in charge is more important. In that case, what is necessary is to set the initial values of the monitoring permission flag 205 and the switching permission flag 206 to "0", in all the communication terminal devices 10, 11, and 12 of the information communication system 1. When constituted in this way, the construction person in charge in particular does not need to perform the setup. When sufficient time passes, the information communication system 1 becomes in the state where at least one of the communication terminal devices 10, 11, and 12 is operating by the master unit operation mode.

Alternatively, the information communication system 1 may be designed so as to include a device that always starts up in the master unit operation mode as a communication terminal device. For example, a large number of lighting devices may be provided as the communication terminal devices 10, 11, 12, 13, 14, and 15, and a controller that operates only in the master unit operation mode may be provided as the communication terminal device. At the initial start up of a new installation, the probability of such the controller already being faulty is low. Therefore, when newly installed, the controller can be expected to start up normally, and since only the controller serves as the master unit, the operation can be started relatively early without the occurrence of many master units.

After that, on the timing when the network 91 settles down, the values of the monitoring permission flag 205 and the switching permission flag 206 of the communication terminal devices 10, 11, and 12 are rewritten to "0" automatically (or selectively). Thereby, when the controller fails, the communication terminal devices 10, 11, and 12 can be configured to switch to the master unit operation mode. Furthermore, it can be setting the priority of the controller as the master unit to the highest priority. Thereby, when the controller is restored and restarted, even if the communication terminal device 10, 11, and 12 operating proxycally in the master unit operation mode exists, it is possible to configure to become in the slave unit operation mode. In this case, the controller configured to start up in the master unit operation mode can be come back to the master unit automatically.

Moreover, as described above, the information communication system 1 in some embodiments is assumed as the business use system. However, the present invention is not limited to a business use system. It is also applicable to the home use system.

Returning to FIG. 4, when the switching permission flag 206 is "0" (Yes in Step S9), the switching unit 232 rewrites the mode identifier 204 to "0" (Step S10). And after rewriting the mode identifier 204, the switching unit 232 reboots the communication terminal device 10 promptly (Step S11). The communication terminal device 10 rebooted by Step S11 returns to the process of Step S1.

As already explained, even if the communication terminal device 10 is rebooted, the set value to the mode identifier 204 is not lost. Therefore, since the mode identifier 204 is set to "0", when Step S1 is performed immediately after performing Steps S10 and S11, the judgment is "No" in Step S1. The processing after being judged to be "No" in Step S1 is mentioned later.

In the processing shown in FIG. 4, it has been explained that, when it is judged as "No" in Steps S8 and S9, the process returns to Step S2 and returns to the process of searching for the master unit again. However, at the time when Steps S8 and S9 are executed, the standby time 207 has already passed (Yes in Step S7). Therefore, when the judgement in Step S8 or Step S9 is "No", the CPU 100 may execute error processing (for example, timeout display) and stop the operation. In particular, in the communication terminal devices 13, 14 and 15 that never switch to the master unit, the judgment of "Yes" is never made in Step S9. Therefore, if the process returns to Step S2 each time a "No" judgement is made in Step S9, an infinite loop may occur.

Next, the case where the decision in Step S2 of FIG. 4 is judged "Yes", is explained. In the case where the decision result is "Yes" in Step S2, the result shows that the communication terminal device 10 is operating in the slave unit operation mode and the master unit that can communicate with the self device exists.

When the decision result is "Yes" in Step S2, based on the information received by the communication unit 105, the communication control unit 230 creates the master unit information 202 regarding the master unit whose presence has been confirmed (Step S3). If the received information includes information about the master unit, the communication control unit 230 includes the information about the master unit in the master unit information 202, thereby executing the process of Step S3. The received information contains identification information for identifying the source. Therefore, the identification information of the source can be included in the master unit information 202 created in Step S3.

In addition, it is acceptable that the master unit information 202 created in Step S3 may not be complete as the master unit information 202. In other words, the master unit information 202 may be temporarily created transitional based on some of the information which has been collected until Step S3 is executed. Further, as already explained, the master unit whose existence is confirmed at this time is not limited to the intra-group communication destination, but may be the out-group communication destination.

When Step S3 is executed, the master unit monitoring unit 231 judges whether or not the master unit information 202 includes information received by the self device. However, when Step S3 is executed, the self device is the slave unit, so the master unit information 202 does not include the information of the self device (not the received information). That is, the master unit information 202 at this time always includes the received information. When the received information is included in the master unit information 202, the identification information (MAC address) of the master unit whose presence is confirmed based on the received information is acquired. Next, the master unit monitoring unit 231 judges whether or not the acquired identification information of the master unit is registered in the blacklist 208 (Step S4).

If the MAC address of the master unit whose presence has been confirmed is stored in the blacklist 208 (Yes in Step S4), the master unit monitoring unit 231 judges that the master unit whose existence has been confirmed is not suitable as the master unit of the self device. In this case, the CPU 100 executes the processes from Step S7, which have already been described, in the same way as when the presence of the master unit is not confirmed.

If the MAC address of the master unit whose presence has been confirmed is not stored in the blacklist 208 (No in Step S4), the communication partner judging unit 233 judges whether or not the master unit whose existence has been confirmed is the member constituting the information communication system 1 (Step S5). In this embodiment, the communication partner judging unit 233 judges whether or not the MAC address of the master unit whose existence has been confirmed is stored in the terminal identification information 211, thereby executing the process of Step S5.

If the MAC address of the master unit whose existence has been confirmed is not stored in the terminal identification information 211 (No in Step S5), the master unit monitoring unit 231 judges that the master unit whose existence has been confirmed is not suitable as the master unit of the self device.

If the MAC address of the master unit whose presence was confirmed in step S2 is not stored in the terminal identification information 211, the master unit is not a device connected to the network 91 (the device is not forming the same group). This master unit is the out-group communication destination.

As already explained, in the information communication system 1, the crosstalk may occur. The crosstalk is communication between the self device and the out-group communication destination. Therefore, when the communication destination due to crosstalk is confirmed as the master unit, this master unit is the out-group communication destination and Neither the communication terminal devices 10, 11, 12, 13, 14, and 15. For example, when the communication terminal device 10 activates as the slave unit (during execution of Step S2) and recognizes the out-group communication destination as the master unit, the communication terminal device 10 is registered as the slave unit for this master unit. In this case, the communication terminal device 10 becomes the out-group communication destination.

Therefore, when the communication partner judging unit 233 judges "No" in Step S5, the master unit monitoring unit 231 adds the MAC address of the master unit whose existence is confirmed at this time to the blacklist 208 (Step S6). Then, in the same way as when the existence of the master unit is not confirmed, the already explained processing from Step S7 is executed. Therefore, the information communication system 1 may prevent the communication terminal devices 10, 11, 12, 13, 14, and 15 from becoming the out-group communication destinations even if the crosstalk occurs at startup.

On the other hand, if the MAC address of the master unit whose existence has been confirmed is stored in the terminal identification information 211 (Yes in Step S5), the master unit monitoring unit 231 judges that the master unit detected is the intra-group communication destination. If judged as "Yes" in Step S5, the communication control unit 230 controls the communication section 105 to transmit a packet requesting the detected master unit to register itself as the slave unit. Thereby, the communication terminal device 10 issues the registration request to the detected master unit (FIG. 5: Step S21).

In addition, the master unit detected in Step S2 is the master unit detected by the method which is called "first come, first served". That is, even if two or more master units already exist on the network 91, the master unit in which the registration demand is carried out in Step S21 at this time is the master unit most detected early in the communication terminal devices 10, 11, and 12. However, by the communication terminal device 10, when two or more master units are already detected, superiority or inferiority of master units may judge according to the number of times of hop, communication quality, etc.

When Step S21 is performed and the communication terminal device 10 has been safely registered in the master unit, the communication terminal device 10 starts the processing (slave unit processing) as the slave unit (Step S22).

In other words, the communication terminal device 10 functions like the slave unit in the PLC on the network 91 by performing Step S22.

In addition, in the state where the communication terminal device 10 has been registered in the new master unit, it does not request registration with another master unit. That is, after the communication terminal device 10 has been registered in a normal master unit, a possibility that it may be again registered in the master unit (unsuitable master unit) which has been registered in the blacklist 208 falls. Therefore, the communication terminal device 10 may delete the master unit registered in the blacklist 208, when the self device has been registered in the new master unit. However, the timing of deletion from the blacklist 208 is not limited to this. The communication terminal device 10 may delete the master unit from the blacklist 208, when predetermined time has passed, after registering the master unit to the blacklist 208. As the other method, the communication terminal device 10 may clear the blacklist 208, when even one master unit is not detected.

Next, the communication terminal device 10 creates (updates) the master unit information 202 based on the information received in Step S22 (Step S23).

In addition, the communication terminal device 10 may require and collect the information which is not acquired by the conventional slave unit processing (Step S22) in Step S23. That is, the master unit information 202 is not limited to the information acquired at the conventional slave unit processing. For example, a situation which the judging criterion information 203 of the master unit on the network 91 is not acquired only by the conventional slave unit processing, may be assumed. In such a situation, the communication terminal device 10 may require the master unit to transmit the judging criterion information 203 in Step S23, and may create the master unit information 202 based on the information (obtained in Step S23) acquired as a response to this.

Further, in the slave unit processing which is the conventional technology, the processing in which the information about the master unit is collected, and the processing in which the database about the master unit is created may be performed. Thus, the information created in the conventional technology is useable as the master unit information 202. That is, in a case that the master unit information 202 is completed in Step S22, Step S23 does not need to be performed separately and independently.

Moreover, although the details will be described later, the communication terminal device 10 repeats Steps S22 and S23, and performs. However, the new information which the communication terminal device 10 should make the master unit information 202 in the timing which performs Step S23 does not necessarily exist. Therefore, when the communication terminal device 10 judges that the necessity information has not been acquired, the communication terminal device 10 may not create (update) the master unit information 202 in Step S23.

When Step S23 has been performed, the communication terminal device 10 judges whether the communication terminal device 10 secedes from the network 91 (Step S24).

When seceding (Yes in Step S24), the communication terminal device 10 gives notice of seceding to the master unit of the self device (a secession packet is transmitted to the master unit). Thereby, the communication terminal device 10 is deleted from the slave unit list of the master unit in which the self device has been registered as the slave unit. The communication terminal device 10 which has seceded returns to Step S1, and starts search of a new master unit. In addition, when seceding, the communication terminal device 10 may register into the blacklist 208 the master unit in which the self device has been registered before seceding.

When the communication terminal device 10 does not secede (No in Step S24), the master unit monitoring unit 231 judges whether the monitoring processing of master units other than the self device is permitted (Step S25). Step S25 is realizable when the master unit monitoring unit 231 refers to the monitoring permission flag 205 and judges whether the monitoring permission flag 205 is "0".

When the monitoring permission flag 205 is "1" (No in Step S25), the communication terminal device 10 (CPU 100) returns to Step S22, and performs the slave unit processing. In this case, the communication terminal device 10 does not check whether other master units exist in addition to the master unit in which the self device has been registered. Thus, the information communication system 1 can reduce the overhead which is generated by usually monitoring other master units according to setting the monitoring permission flag 205 in the communication terminal device 10.

When the monitoring permission flag 205 is "0" (Yes in Step S25), the master unit monitoring unit 231 refers to the master unit information 202, and checks whether other master units exist in addition to the master unit in which the self device is registered (Step S26).

In this manner, the communication terminal device 10 checks whether other master units exist besides the master unit in which the self device has been registered. That is, the communication terminal device 10 has a function detecting the presence of a plurality of master units. In addition, the processing of Step S26 may include the processing in which the communication terminal device 10 searches other master units according to transmitting a new packet. That is, for the judgment in Step S26, depending to only the master unit information 202 created in Step S23 is not necessary.

When no other master unit exists (No in Step S26), the communication terminal device 10 (CPU 100) judges that the coexistence state of the master unit has not occurred, returns to Step S22, and continues the slave unit processing. In this case, the communication terminal device 10 does not change the master unit in which the self device has been registered. Thus, the communication terminal device 10 continues the usual slave unit processing, when other master units do not exist other than the master unit in which the self device has been registered (when the coexistence state of the master unit has not occurred).

When other master units exist (Yes in Step S26), the communication partner judging unit 233 judges whether or not the other master unit whose presence has been confirmed in Step S26 is the intra-group communication destination (another communication terminal device) (Step S27). At this time, the communication partner judging unit 233 judges according to the identification information of the other master unit and the terminal identification information 211.

The communication partner judging unit 233 judges "No" in Step S27, the master unit monitoring unit 231 judges that the master unit does not exist among the intra-group communication destinations other than the master unit with which the self device is registered. In other words, it is judged that the master unit whose presence has been confirmed in Step S26 is the out-group communication destination (for example, the communication terminal device 20).

At this time, the master unit monitoring unit 231 judges that the coexistence state of the master unit does not occur on the network 91, returns to Step S22, and continues the slave unit processing. In this case also, the communication terminal device 10 does not change the master unit in which it is registered. In this way, even if the communication terminal device 10 detects the master unit other than the master unit in which the self device is registered, and if the detected master unit does not exist on the network 91, the communication terminal device 10 judges that the coexistence state of the master unit has not occurred on the network 91. In that case, normal slave unit processing is continued. Therefore, even if the communication terminal device 20 is detected by crosstalk, the communication terminal device 10 is not registered to the communication terminal device 20.

The communication partner judging unit 233 judges "Yes" in Step S27, based on the judgement result, the master unit monitoring unit 231 judges that there is the master unit other than the master unit in which the self device is registered among the intra-group communication destinations. Then, the master unit monitoring unit 231 transmits the coexistence detection signal to the switching unit 232.

When the coexistence detection signal has been transmitted while operating by the slave unit operation mode, the switching unit 232 acquires the judging criterion information 203 of all the coexisting master units respectively from the master unit information 202, and compares them. And the switching unit 232 judges whether the master unit in which the priority is higher than the master unit in which the self device has been registered exists (Step S28). As already explained, in this embodiment, the judging criterion information 203 is the MAC address, and the device has high priority as the master unit in ascending order of the MAC address.

In a case of No in Step S28, the communication terminal device 10 (CPU 100) returns to Step S22, and performs the slave unit processing. In this case, the communication terminal device 10 does not change the master unit in which the self device has been registered. Thus, the communication terminal device 10 continues the usual slave unit processing, when the master unit in which the priority is higher than the master unit in which the self device has been registered does not exist in others.

In a case of Yes in Step S28, the switching unit 232 generates the master unit switching signal and transmits it to the communication control unit 230, and registers master units except the master unit which has the highest priority into the blacklist 208 (Step S29). In addition, the communication control unit 230 to which the master unit switching signal has been transmitted controls the communication unit 105 to transmit and receive the packet to cancel a relation with the registered master unit. Thereby, the relation between the communication terminal device 10 and low priority master unit is canceled.

When Step S29 has been performed, the communication terminal device 10 returns to Step S21. In Step S21 at this time, the communication terminal device 10 (communication control unit 230) requires registering the self device as the slave unit to the highest master unit of the priority.

In addition, the master unit with the highest priority may be transmitted from the switching unit 232 to the communication control unit 230 together with the master unit switching signal. On the other hand, since all low priority master units are being registered in the blacklist 208, the communication control unit 230 may only broadcast the registration demand packet.

Thus, the information communication system 1 registers the slave unit into the high master unit of the priority as the master unit, without waiting for release from the master unit, when the situation where two or more master units exist has been detected. It shortens time which is necessary to establish communication between new master unit and slave unit. Therefore, the restoration time for the slave unit which changes the master unit is shortened.

The description to here has mentioned mainly to processing in which the communication terminal device 10 operates by the slave unit operation mode. Next, processing in which the communication terminal device 10 operates by the master unit operation mode is described. The case where the communication terminal device 10 operates by the master unit operation mode is a case where it has been judged No in Step S1 shown in FIG. 4. And the case where it has been judged No in Step S1 is a case where the mode identifier 204 is "0", when the communication terminal device 10 starts.

In the case where it has been judged to be "No" in Step S1, the communication terminal device 10 (CPU 100) performs the master unit processing (FIG. 6: Step S31).

After the master unit processing is completed, the communication control unit 230 creates (updates) the master unit information 202 (Step S32). The processing in Step S32 is the same as it in Step S23.

Next, the master unit monitoring unit 231 judges whether or not the process of monitoring the master unit other than the self device is permitted (Step S33). Like Step S25, Step S33 is realizable, when the master unit monitoring unit 231 refers to the monitoring permission flag 205 and judges whether the monitoring permission flag 205 is "0".

When the monitoring permission flag 205 is "1" (No in Step S33), the communication terminal device 10 (CPU 100) returns to Step S31, and performs the master unit processing. In this case, the communication terminal device 10 does not check whether or not there is another master unit other than the self device. Thus, the information communication system 1 can reduce the overhead which is generated by usually monitoring other master units according to setting the monitoring permission flag 205 in the communication terminal device 10.

When the monitoring permission flag 205 is "0" (Yes in Step S33), the master unit monitoring unit 231 refers to the master unit information 202, and checks whether other master units exist in addition to the self device (Step S34).

In this manner, the communication terminal device 10 can check whether other master units exist besides the self device. That is, the communication terminal device 10 can detect the presence of two or more master units. In addition, like Step S26, the processing of Step S34 may include the processing in which the communication terminal device 10 searches other master units according to transmitting a new packet. That is, the judgement in Step S34 does not have to rely solely on the master unit information 202 created in Step S32.

When no other master unit exists (No in Step S34), the communication terminal device 10 (CPU 100) returns to Step S31, and performs the master unit processing. In this case, the communication terminal device 10 does not switch the master unit operation mode. Thus, the communication terminal device 10 continues the usual master unit processing, when other master units do not exist other than the self device (when the coexistence state of the master unit has not occurred).

If there is another master unit (Yes in Step S34), the communication partner judging unit 233 judges whether or not the other master unit whose presence has been confirmed in Step S34 is the intra-group communication destination (another communication terminal device) (Step S35). At this time, the communication partner judging unit 233 judges according to the identification information of the other master unit detected and the terminal identification information 211.

If the communication partner judging unit 233 judges "No" in Step S35, based on the judgement result, the master unit monitoring unit 231 judges that there is no other master unit among the intra-group communication destinations. In other words, it is judged that the master unit whose presence has been confirmed in Step S34 is the out-group communication destination (for example, the communication terminal device 20).

At this time, the master unit monitoring unit 231 judges that the coexistence state of the master unit does not occur on the network 91. Therefore, the communication terminal device 10 returns to Step S31 and continues the master unit processing. In this case, the communication terminal device 10 does not switch the master unit operation mode. In this way, when the communication terminal device 10 is operating in the master unit operation mode, even if the communication terminal device 10 detects the master unit other than the self device, and if the detected master unit does not exist on the network 91, the communication terminal device 10 judges that the coexistence state of the master unit has not occurred on the network 91. In that case, normal master unit processing is continued. Therefore, even if the communication terminal device 20 is detected due to crosstalk, the communication terminal device 10 does not transition to the slave unit operation mode.

The Crosstalk occurs when communication signals in another network 92 are mixed into the network 91. For example, the crosstalk occurs a cable in network 91 picks up a signal on another network 92 (for example, a signal from communication terminal device 20) like an antenna. Further, for example, when the network 91 uses wireless communication, the crosstalk occurs when the communication terminal device 10 receives radio waves transmitted by the communication terminal device 20.

FIGS. 7 to 10 show how the operation modes of the communication terminal devices 20, 21, 30, and 31 are switched. In FIG. 7 to 10, the communication terminal devices 30 and 31 have a function of detecting the coexistence state of the master unit and appropriately switching the operation mode of the self device between the master unit operation mode and the slave unit operation mode. As a technique for realizing the communication terminal devices 30 and 31, for example, the technique described in Japanese Unexamined Patent Application Publication No. 2018-191116 can be used.

In addition, in FIGS. 7 to 10, four of the boxes indicate the communication terminal devices 20, 21, 30 and 31, respectively.

In addition, in FIGS. 7 to 10, the numbers in the boxes indicate the signs of the communication terminal devices 20, 21, 30, and 31. Therefore, "30" in "M30" indicates that the box is the communication terminal device 30.

In addition, in FIGS. 7 to 10, the alphabets in the boxes indicate the operation mode of the communication terminal devices 20, 21, 30, and 31. That is, "M" indicates that the device is operating in "the master unit operation mode". And "T" indicates that the device is operating in "the slave unit operation mode".

In addition, in FIGS. 7 to 10, the communication terminal devices 30 and 31 marked with an asterisk indicate that switching of the operation mode is permitted. On the other hand, the communication terminal devices 20 and 21 not marked with an asterisk indicate that switching of the operation mode is not permitted. In the examples shown in FIGS. 7 to 10, it is assumed that the communication terminal devices 30 and 31 are permitted to monitor the master unit.

Moreover, in FIGS. 7 to 10, unhatched boxes indicate states in which registration as the master unit or the slave unit has not been completed (unregistered state). On the other hand, hatched boxes indicate states in which registration as the master unit or the slave unit has been completed (however, this is not necessarily the final registration state). Additionally, identical hatched boxes indicate that they belong to the group of common master unit.

Furthermore, in the examples shown in FIGS. 7 to 10, it is assumed that the MAC addresses of the communication terminal devices 20, 21, 30, and 31 are the signs of individual devices. That is, the MAC address of the communication terminal device 30 is assumed to be "30".

Figure 7:
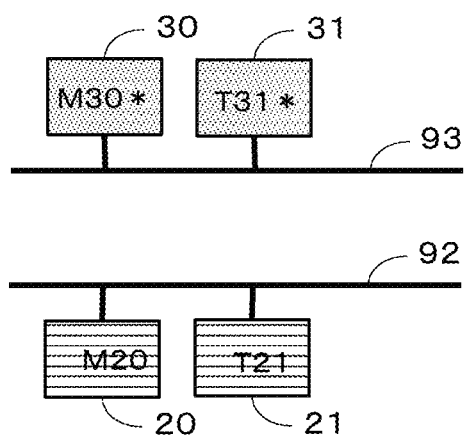
FIG. 7 is a block diagram example showing switching state of operation modes of the communication terminal devices.

FIG. 7 shows that the communication terminal device 30 is registered as the master unit, and another communication terminal device 31 is registered as the slave unit of the communication terminal device 30. That is, FIG. 7 shows a state in which only the communication terminal device 30 exists as one master unit in the network 93 and the normal PLC network has already been completed. FIG. 7 also shows that, on the network 92, the communication terminal device 20 is registered as the master unit and the communication terminal device 21 is registered as the slave unit of the communication terminal device 20. Furthermore, in a state shown in FIG. 7, it is assumed that the crosstalk does not occur between the network 92 and the network 93.

Figure 8:
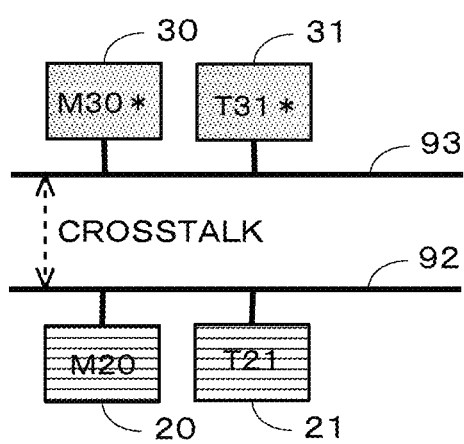
FIG. 8 is a block diagram example showing switching state of the operation modes of the communication terminal devices.

FIG. 8 shows a state immediately after the crosstalk occurs between the network 92 and the network 93 from the state shown in FIG. 7. In the following description, it is assumed that communication between the communication terminal device 20 and the communication terminal device 30 is enabled. However, since the crosstalk is unintended communication, it is originally unpredictable which devices will establish the crosstalk.

When the communication terminal device 30 recognizes the communication terminal device 20 operating in the master unit operation mode while operating in the master unit operation mode, the communication terminal device 30 recognizes the communication terminal device 20 as the master unit other than the self device. That is, the communication terminal device 30 judges that the coexistence state of the master unit has occurred. Thus, when communication is established between the communication terminal device 20 and the communication terminal device 30 due to the occurrence of the crosstalk, the communication terminal device 30 detects the coexistence state of the master unit.

The communication terminal device 30 that has detected the coexistence state of the master unit, in order to narrow down the coexisting master unit to one, selects one master unit to remain. Here, the communication terminal device 30 compares its own MAC address "30" with the MAC address "20" of the communication terminal device 20. Then, the communication terminal device 30 judges that communication terminal device 20, which is the master unit other than the self device, has a higher priority as the master unit. And the communication terminal device 30 judges that the communication terminal device 20 should remain. Therefore, the communication terminal device 30 cancels the slave unit (communication terminal device 31) registered with itself and changes own operation mode to the slave unit operation mode.

Figure 9:
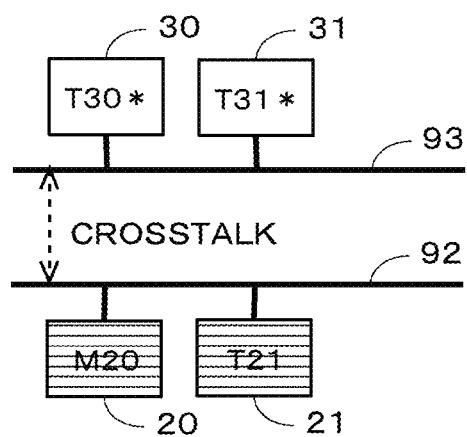
FIG. 9 is a block diagram example showing switching state of the operation modes of the communication terminal devices.

FIG. 9 shows a state in which the communication terminal device 30 has transitioned to the slave unit. As shown in FIG. 9, the alphabet in the box representing the communication terminal device 30 has changed to "T", and the communication terminal device 30 has shifted to the slave unit operation mode. In addition, the communication terminal devices 30 and 31 are shown in the unregistered state (not hatched) because their registration has been canceled. The communication terminal devices 30 and 31 that have become unregistered state start searching for the master unit and wait until a new master unit is detected.

The example in this case, the crosstalk has been occurred between communication terminal device 20 and communication terminal device 30. Therefore, the communication terminal device 30 requests registration from the communication terminal device 20 (remaining master unit). On the other hand, since the communication terminal device 31 cannot communicate with the communication terminal device 20, the communication terminal device 20 cannot be detected as the master unit. Therefore, the communication terminal device 31 changes own operation mode to the master unit operation mode and transitions to the master unit.

Figure 10:
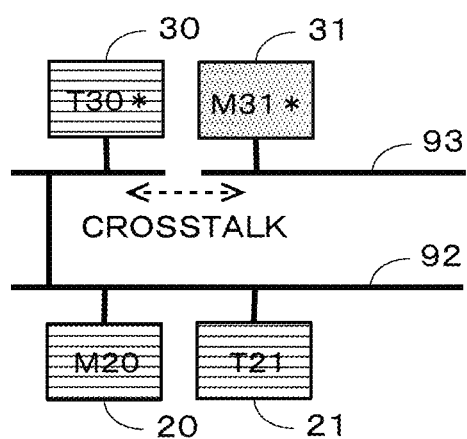
FIG. 10 is a block diagram example showing switching state of the operation modes of the communication terminal devices.

FIG. 10 shows a state in which registration of the communication terminal devices 30 and 31 is completed. As shown in FIG. 10, the communication terminal device 30 is registered as the slave unit of the communication terminal device 20 and incorporated into the network 92. However, in FIG. 10, portions of the network 92 that are logically connected by the crosstalk are indicated by solid lines, but they are not physically connected by power lines, and communication is unstable.

On the other hand, the communication terminal device 31 remains in the network 93 as the master unit, but has been separated from the communication terminal device 30. Even in the state of FIG. 10, the communication terminal device 30 and the communication terminal device 31 are physically connected by the power line and communication is established. However, the communication is considered the crosstalk between the network 92 and the network 93.

As is clear from comparing FIG. 7 and FIG. 10, if the crosstalk occurs in the communication terminal device 30, the network 93 cannot be maintained as designed.

If the communication terminal device 31 can communicate with the communication terminal device 20 via the communication terminal device 30 by hopping or the like, the communication terminal device 31 requests the communication terminal device 20 to register. In this case, the communication terminal devices 20, 21, 30 and 31 are integrated into one network 92. In any case, the state of the network 93 shown in FIG. 7 cannot be maintained.

Conventionally, grouping of a plurality of the communication terminal devices 20, 21, 30, 31 connected to the PLC into a plurality of the networks 92, 93 has not been assumed. That is, conventionally, the unique problem that the network 92 and the network 93, which should originally be divided into different groups, are integrated when crosstalk occurs in an information communication system that uses the PLC has not been assumed. However, due to the diversification of communication terminal devices and the explosive increase in communication terminal devices, there is new need to divide the communication terminal devices connected to the PLC into a plurality of networks. As a result, the aforementioned problem has arisen as a new problem.

Specifically, in the PLC, the cables used to transmit signals are power lines. Compared to cables dedicated to communication, power lines are structurally weaker in terms of countermeasures against noise signals, and crosstalk is more likely to occur. Moreover, in a facility, it is common practice to lay a plurality of power lines in a bundled state. In such an installation state, the power lines forming the networks of different groups are arranged in parallel over a relatively long distance in close proximity to each other. There is a circumstance that crosstalk is likely to occur in the PLC due to such a laying state peculiar to the power line.

However, as already explained, in the information communication system 1 according to some embodiments, even if the communication terminal device 20 (the out-group communication destination) is detected as the master unit by crosstalk, the communication terminal device 10 as the master unit does not transition to the slave unit. Therefore, it is possible to prevent the communication terminal device 10 that has transitioned to the slave unit from recognizing the communication terminal device 20 other than the intra-group communication destination as the master unit. That is, the information communication system 1 may prevent the network 91 from being integrated with another network 92.

Returning to FIG. 6, when the communication partner judgement unit 233 judges "Yes" in Step S35, based on the judgement result, the master unit monitoring unit 231 judges that the master unit other than the self device exists among the intra-group communication destinations, and transmits the coexistence detection signal to the switching unit 232. When the coexistence detection signal has been transmitted while operating by the master unit operation mode, the switching unit 232 acquires the judging criterion information 203 of all the master units other than the self device respectively from the master unit information 202, and compares them with the judging criterion information 203 registered in the configuration information 201 of the self device. And the switching unit 232 judges whether the master unit in which the priority is higher than the self device exists (Step S36).

In a case of "No" in Step S36, the communication terminal device 10 (CPU 100) returns to Step S31, and performs the master unit processing. In this case, the communication terminal device 10 does not switch to the slave unit operation mode. Thus, even if the coexistence state of the master unit occurs, the communication terminal device 10 continues the usual master unit processing, w % ben the master unit in which the priority is higher than the self device does not exist in others.

Thereby, in the information communication system 1, the switching to the slave unit operation mode of the master unit with the highest priority is being forbidden. Therefore, for example, even if all the communication terminal devices 10, 11, and 12 are permitted to switch to the slave unit operation mode, unless it is also unexpected situations (e.g. broken), at least one master unit is continued to exist.

In a case of Yes in Step S36, the switching unit 232 generates the master unit switching signal and transmits the signal to the communication control unit 230. In addition, the communication control unit 230 to which the master unit switching signal has been transmitted controls the communication unit 105 to transmit and receive the packet to cancel a relation with all the registered slave unit. Thereby, the communication terminal device 10 cancels a relation with the registered slave unit (Step S37).

When Step S37 has been performed, the switching unit 232 rewrites the mode identifier 204 into "1" (Step S38), and reboots the communication terminal device 10 (Step S39).

When the communication terminal device 10 is rebooted by Step S39, the communication terminal device 10 returns to Step S1. In Step S1 performed at this time, the mode identifier 204 is "1". Therefore, the communication terminal device 10 is started by the slave unit operation mode, and is judged to be Yes in Step S1. In this way, when the coexistence state of the master unit is detected on the network 91, the communication terminal device 10 operating in the master unit operation mode switches to the slave unit operation mode if the priority as the master unit is low.

As described above, the communication terminal device 10 connected to the network 91 and performing data communications with another communication terminal device 11, 12, 13, 14, and 15 (the intra-group communication destination) through the network 91, has the master unit operation mode in which it operates as the master unit and the slave unit operation mode in which it operates as the slave unit. The communication terminal device 10 includes the storage device 101 which stores the configuration information 201 used as the criterion for switching the operation mode between the master unit operation mode and the slave unit operation mode. The configuration information 201 includes the judging criterion information 203 used as the criterion which judges the priority as the master unit of the self device. The communication partner judging unit 233 judges, based on received information by the self device, whether or not source of the received information is the other communication terminal device 11, 12, 13, 14, and 15. The master unit monitoring unit 231 monitors whether or not the other communication terminal device 11, 12, 13, 14, and 15 is the master unit based on the judgement by the communication partner judging unit 233. The communication unit 105 acquires the judging criterion information 203 of the other communication terminal device 11, 12, 13, 14, and 15 detected as the master unit by the master unit monitoring unit 231. The switching unit 232 switches, while the self device is operating by the master unit operation mode and when the other master unit is detected by the master unit monitoring unit 231, the master unit operation mode of the self device to the slave unit operation mode based on the judging criterion information 203 of the self device and the judging criterion information 203 of the other master unit acquired by the communication unit 105.

As a result, communication terminal devices 10, 11, and 12 can prevent misidentifying the communication terminal device 20 on network 92 as the master unit on the network 91 even if crosstalk occurs while operating in the master unit operation mode. Therefore, it is possible to prevent a transition to the slave unit operation mode due to misidentification. That is, it is possible to prevent unintended cull of the master unit. Therefore, it is possible to prevent the network 91 from being integrated with another network 92 by misidentifying the communication terminal device 20 other than the intra-group communication destination as the master unit.

In addition, while the communication terminal device 10 is operating by the slave unit operation mode and while the master unit in which the self device is registered is operating by the master unit operation mode, based on the judgement of the communication partner judging unit 233, the master unit monitoring unit 231 monitors whether or not another master unit exists in the intra-group communication destinations. The communication unit 105 acquires the judging criterion information 203 (first judging criterion information) used as the criterion which judges the priority as the master unit of the master unit of the self device and the judging criterion information 203 (second judging criterion information) used as the criterion which judges the priority as the master unit of the other master unit. When the other master unit is detected by the master unit monitoring unit 231, based on the first judging criterion information 203 and the second judging criterion information 203, the switching unit 232 decides one of the master unit of the self device and the other master unit as the master unit for the self device.

As a result, even if crosstalk occurs while operating in the slave unit operation mode, the communication terminal device 10, 11, 12, 13, 14 and 15 can prevent misidentifying the communication terminal apparatus 20 on network 92 as the master unit on the network 91 (the master unit other than the master unit of the self device). Therefore, the communication terminal device 10, 11, 12, 13, 14 and 15 can be prevented from secede from its master device due to misidentification. That is, it is possible to prevent unintended cull of the master unit. Therefore, it is possible to prevent the network 91 from being integrated with another network 92 by misidentifying the communication terminal device 20 other than the intra-group communication destination as the master unit.

The storage device 101 of the communication terminal device 10, 11, 12, 13, 14 and 15 stores the terminal identification information 211 for individually identifying the other communication terminal devices (intra-group communication destinations). Then, the communication partner judging unit 233 judges whether the terminal identification information 211 stored in the storage device 101 includes identification information for identifying the source included in the received information. Based on the judgement, the communication partner judging unit 233 judges whether or not the source of the received information is the intra-group communication destination. This makes it possible to easily judge whether or not the source is the intra-group communication destination.

In the description above, the master unit with the smaller judging criterion information 203 (MAC address) is judged to have the higher priority as the master unit. However, it is also possible to judge that the master unit with the larger judging criterion information 203 (MAC address) has the higher priority as the master unit.

Further, in the description above, it is explained that the communication terminal device 10 executes Step S5 when it activated as the slave unit. In other words, the procedure for authenticating whether or not the detected master unit is the intra-group communication destination by the communication partner judging unit 233 of "the slave unit" has been described. However, authentication as to whether or not the detected master unit is the intra-group communication destination may be performed in "the master unit". For example, the activated slave unit transmits a registration request including the judging criterion information 203 (own MAC address) in Step S2. The communication partner judging unit 233 of "the master unit" that receives this registration request may be configured to check the terminal identification information 211 and permit registration only when the slave unit is the intra-group communication destination. If permission is obtained from the master unit, the slave unit may judge "Yes" in Step S2 assuming that the master unit exists.

In the above embodiment, it is judged whether or not the source of the received information from the master unit (master unit information 202) is the intra-group communication destination according to the terminal identification information 211. However, the information for judging whether or not the source of the received information is the intra-group communication destination is not limited to the terminal identification information 211.

Figure 11:
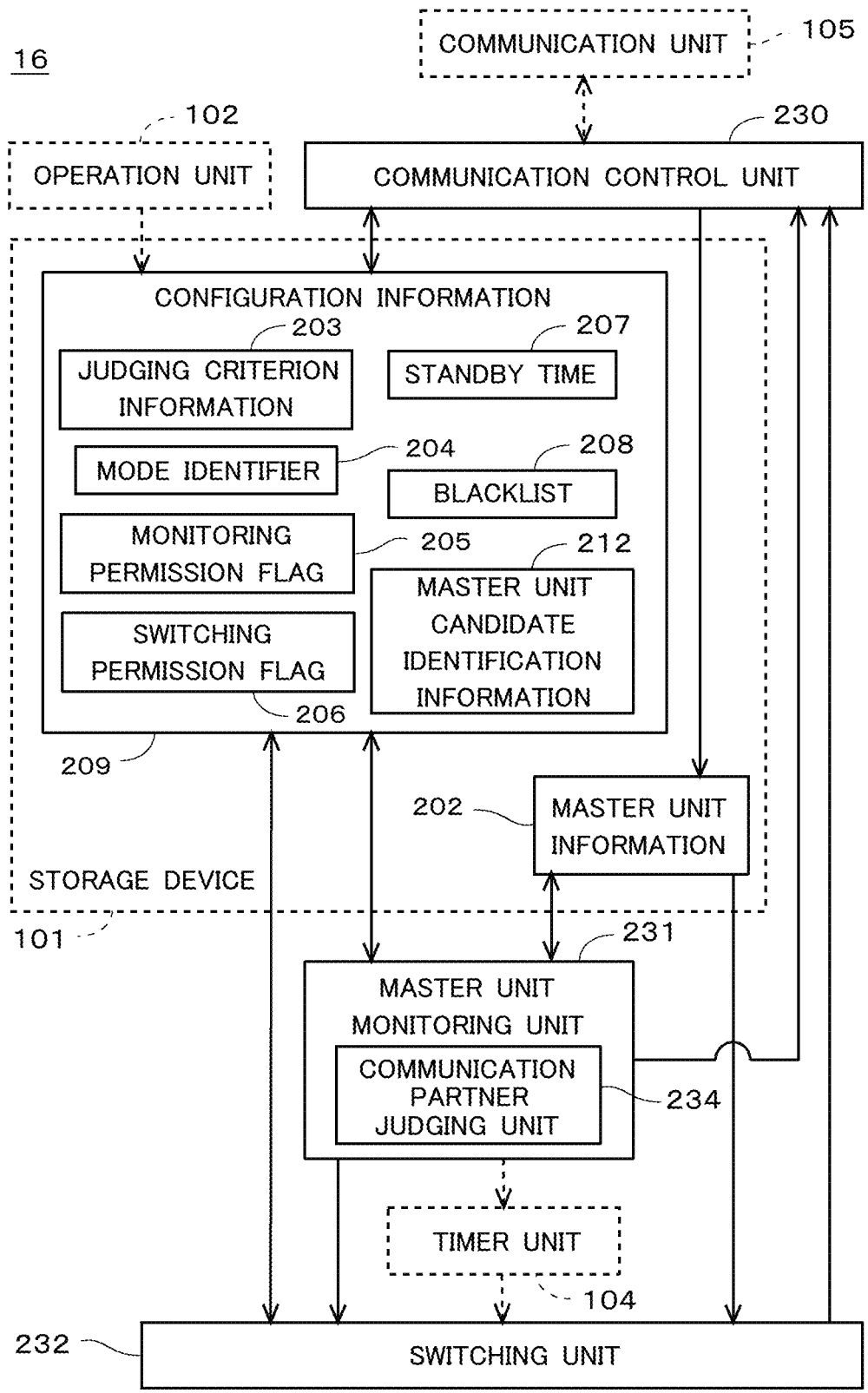
FIG. 11 is a block diagram of functional blocks included in the communication terminal device in accordance with another embodiment, with a data flow.

FIG. 11 is a block diagram of functional blocks included in a communication terminal device 16 in accordance with another embodiment, with a data flow. The communication terminal device 16 in the other embodiment differs from communication terminal device 10 in that communication partner judging unit 234 is provided instead of the communication partner judging unit 233. In the following description, among the configurations of the communication terminal device 16, the same components as those of the communication terminal device 10 are denoted by the same reference numerals, and the description thereof will be omitted as appropriate. Although the program 200 in the above embodiment and the program 200 in the other embodiment are described using the same reference numerals, strictly speaking, they are not the same.

The storage device 101 in the other embodiment stores configuration information 20) different from the configuration information 201. The configuration information 209 differs from the configuration information 201 in that it includes master unit candidate identification information 212 instead of the terminal identification information 211.

The master unit candidate identification information 212 is identification information (MAC address) of the communication terminal devices 10, 11, and 12 that have the master unit operation mode and may operate as the master unit of the intra-group communication destination within the network 91. Specifically, for example, the terminal identification information 211 is "10, 11, 12, 13, 14, 15", but the master unit candidate identification information 212 is "10, 11, 12".

The communication partner judging unit 234 is a functional block achieved by the operation of the CPU 100 operating in according with the program 200. In the situation in which communication partner judging unit 233 refers to the terminal identification information 211, the communication partner judging unit 234 refers to the master unit candidate identification information 212 instead of the terminal identification information 211.

The situation where the communication partner judging unit 233 refers to the terminal identification information 211 is the situation where the identification information acquired from the master unit information 202 (information indicating one of the master units in the intra-group communication destination) is used. Therefore, in the terminal identification information 211, the identification information of the communication terminal devices 13, 14, and 15 that do not operate as the master units is not necessary.

On the other hand, since communication partner judging unit 234 refers to the master unit candidate identification information 212, the amount of information to be stored in the storage device 101 can be reduced.

As described above, the storage device 101 of the communication terminal device 16 according to the other embodiment stores the master unit candidate identification information 212 for individually identifying the candidate of the master unit among the other communication terminal devices (intra-group communication destinations). In addition, the communication terminal device 16 includes the communication partner judging unit 234. Moreover, the communication partner judging unit 234 judges, based on a result of judging whether or not the master unit candidate identification information 212 stored in the storage device 101 includes identification information for identifying the source included in the received information, whether or not the source of the received information is the intra-group communication destination. As a result, the amount of information to be stored may be reduced compared to the case of storing all the identification information of the intra-group communication destinations.

In the above embodiments, it is judged whether or not the source of the received information from the master unit (master unit information 202) is the intra-group communication destination according to the terminal identification information 211 or the master unit candidate identification information 212. However, the information for judging whether or not the source of the received information is the intra-group communication destination is not limited to these information.

Figure 12:
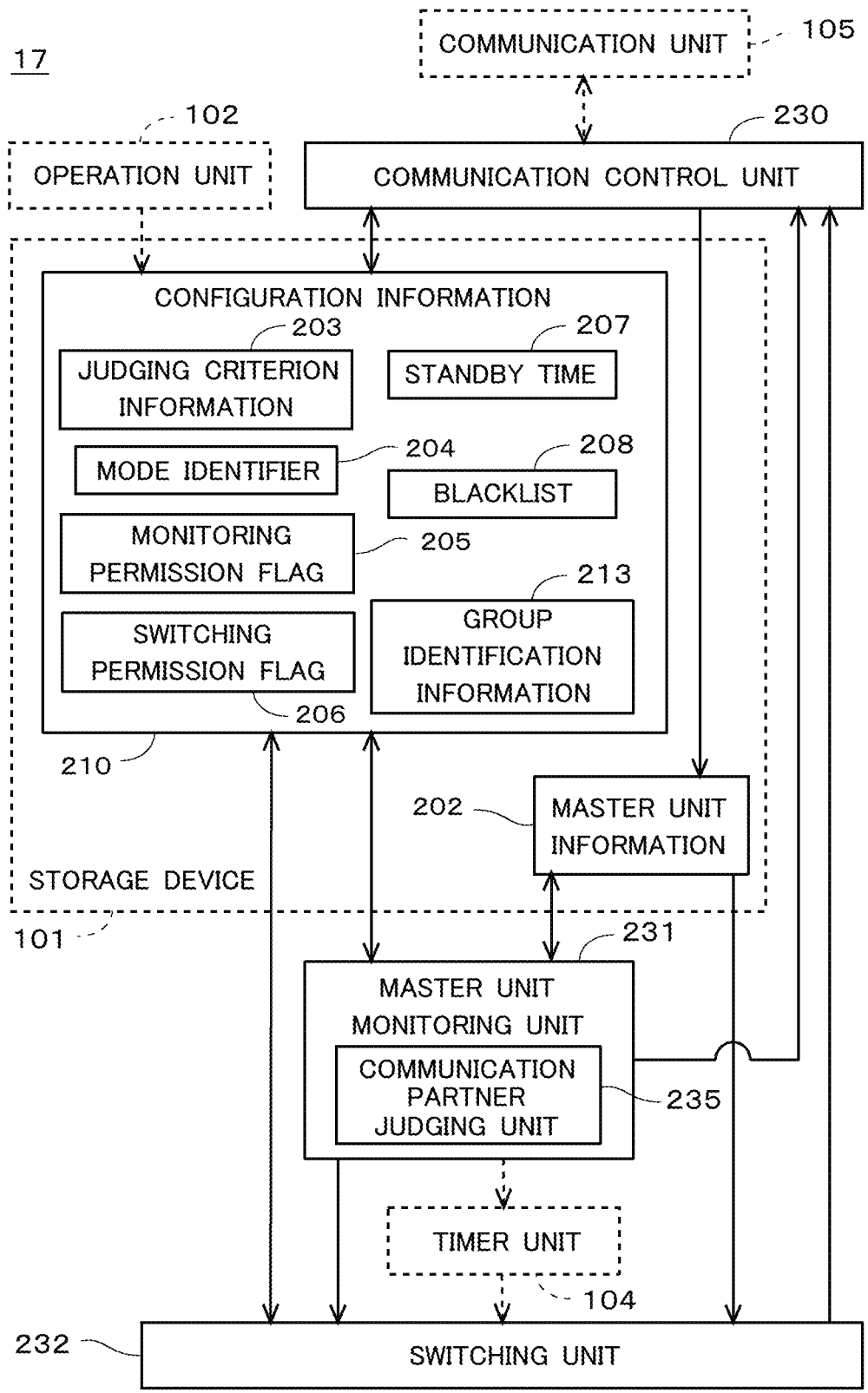
FIG. 12 is a block diagram of functional blocks included in the communication terminal device in accordance with still another embodiment, with a data flow.

FIG. 12 is a block diagram of functional blocks included in a communication terminal device 17 in accordance with still another embodiment, with a data flow. The communication terminal device 17 in the still other embodiment differs from communication terminal device 16 in that communication partner judging unit 235 is provided instead of the communication partner judging unit 234. In the following description, among the configurations of the communication terminal device 17, the same components as those of the communication terminal device 16 are denoted by the same reference numerals, and the description thereof will be omitted as appropriate. Although the program 200 in the other embodiment and the program 200 in the still other embodiment are described using the same reference numerals, strictly speaking, they are not the same.

The storage device 101 in the still other embodiment stores configuration information 210 different from the configuration information 209. The configuration information 210 differs from the configuration information 209 in that it includes group identification information 213 instead of the master unit candidate identification information 212.

The group identification information 213 is information for identifying the intra-group communication destinations (other communication terminal devices) from communication terminal devices belonging to other groups (for example, the communication terminal device 20 and 21). The value of the group identification information 213 in the still other embodiment is "1".

The value of the upper digit (10's digit) of the identification information (MAC address) of the communication terminal devices 10, 11 and 12, which are the intra-group communication destinations within the network 91, is "1". On the other hand, the value of the upper digit (digit of 10) of the identification information (MAC address) of the communication terminal device 20 and 21 of the out-group communication destinations, is "2". Therefore, by storing "1" as the group identification information 213, it is possible to judge whether or not the source of the received information is the communication terminal device 10, 11, or 12.

The communication partner judging unit 235 is a functional block achieved by the operation of the CPU 100 operating in according with the program 200. In the situation in which communication partner judging unit 234 refers to the master unit candidate identification information 212, the communication partner judging unit 235 refers to the group identification information 213 instead of the master unit candidate identification information 212. Then, it is judged whether or not the tens digit of the MAC address of the source of the received information matches "1" of the group identification information 213.

In this way, by storing information that is common to the intra-group communication destinations and that differs for the out-group communication destinations as the group identification information 213, the amount of information to be stored in the storage device 101 may be reduced.

As described above, the storage device 101 of the communication terminal device 17 according to the still other embodiment stores the group identification information 213 for identifying the other communication terminal devices (intra-group communication destinations) from communication terminal devices of other groups (out-group communication destinations). In addition, the communication terminal device 17 includes the communication partner judging unit 235. Moreover, the communication partner judging unit 235 judges, based on comparing the group identification information 213 stored in the storage device 101 with identification information for identifying a source included in the received information, whether or not the source of the received information is the intra-group communication destination. As a result, the amount of information to be stored may be suppressed compared to the case of storing identification information related to the plurality of the communication terminal devices 10, 11, and 12.

As mentioned above, although described about some embodiments, the present invention is not limited to the above-mentioned embodiments, and various deformation is possible for it.

For example, the Steps shown in some embodiments are mere examples. The Steps are not limited to the order and the contents described above. That is, if the same effect can be acquired, the order or the contents may be modified as appropriate.

The functional blocks (e.g., the master unit monitoring unit 231 and the switching unit 232) shown in some embodiments are achieved in forms of software by the operation of the CPU 100 in accordance with the program 200. However, a portion or an entire portion of those functional blocks may be formed by a dedicated logic circuit in the form of hardware.

Moreover, the numerical value used as the judging criterion information 203 is not limited to the form of the above description. For example, it may be considerable that the numerical value used as the judging criterion information 203 is the worst value of the communication quality of the slave unit registered in the network to which the self device belongs. In this case, the priority as the master unit which has the smaller numerical value of the judging criterion information 203 is judged highly. Since the master unit which has the large worst value of communication quality is switched to the slave unit operation mode by this, the worst value of the communication quality in the network 91 finally built is reduced. A retrial frequency, a noise level, and transmission speed etc., can be collected suitably as information indicating communication quality, and can be adopted. Moreover, after weighting to these suitably, the priority may be judged.

Furthermore, the judging criterion information 203 may be a time elapsed from the master unit operation mode start of the master unit in the network to which the self device belongs. In this case, the priority as the master unit which has the larger numerical value of the judging criterion information 203 is judged highly. Since the master unit where elapsed time is smaller can be switched to the slave unit operation mode by this, the master unit which has already been operating stably as the master unit is preferentially maintainable.

Moreover, the judging criterion information 203 may be a date of manufacture of the communication terminal devices 10, 11, 12, 13, 14, and 15. In that case, the priority of the new communication terminal device 10, 11, 12, 13, 14, and 15 of the date of manufacture is judged high. The new communication terminal devices 10, 11, 12, 13, 14, and 15 have a low risk of generally breaking down compared with an old thing. Therefore, the master unit more important than the slave unit can be stabilized by making the new communication terminal device 10, 11, 12, 13, 14, and 15 of the date of manufacture remains as the master unit preferentially.

Moreover, in some embodiments described above, when it is detected that two or more master units exist simultaneously, it has been described that one of the master units switches to the slave unit. However, the opportunity from which the master unit switches to the slave unit is not limited to this. For example, when there is fear of the performance decrement of the master unit (e.g., increasing of the number of times of a retry of the communication terminal device 10 which is operating by the master unit operation mode), the communication terminal device 10 may change the operation mode of the self device to the slave unit operation mode. That is, the communication terminal device 10 stores minimum performance as a threshold value (the configuration information 201), and switches the operation mode according to comparing an actual value in performance with the threshold value. Moreover, a period and turn of operating as the master unit may be stored as the configuration information 201. In this case, when the period has passed, the master unit may switch the self device to the slave unit operation mode. That is, the master unit may be made into a rotation system. Thereby, when the self device is the master unit, the competence as the master unit of the self device can be judged, and the communication terminal device 10 can switch to the slave unit operation mode automatically. Therefore, the situation in which an unsuitable master unit continues as the master unit is reduced.

While the invention has been shown and described in detail, the foregoing description is in all aspects illustrative and not restrictive. It is therefore understood that numerous modifications and variations can be devised without departing from the scope of the invention. The scope of the present invention is shown by claims.

What is claimed is:

1. A communication terminal device connected to a network and performing data communications with an intra-group communication terminal device through the network, the communication terminal device comprising:
    a storage configured to store information used as a criterion for switching an operation mode between a master unit operation mode and a slave unit operation mode, the information including judging criterion information used as a criterion for judging a priority of the communication terminal device as a master unit; and
    circuitry configured to:
        judge, based on received information by the communication terminal device, whether or not a source of the received information is the intra-group communication terminal device;
        monitor whether or not the intra-group communication terminal device is the master unit based on the judgement;
        acquire the judging criterion information of the intra-group communication terminal device detected as the master unit by the monitoring; and
        switch, while the communication terminal device is operating by the master unit operation mode and when the intra-group communication terminal device is detected as the master unit by the monitoring, the master unit operation mode of the communication terminal device to the slave unit operation mode based on the judging criterion information of the communication terminal device and the judging criterion information of the intra-group communication terminal device detected as the master unit, wherein
    the master unit operation mode is the operation mode of the communication terminal device operating as the master unit, and
    the slave unit operation mode is the operation mode of the communication terminal device operating as a slave unit.

2. The communication terminal device according to claim 1, wherein
    the storage is further configured to store terminal identification information for individually identifying the intra-group communication terminal device, and
    the circuitry is further configured to judge that the source of the received information is the intra-group communication terminal device when the terminal identification information stored in the storage includes identification information for identifying the source of the received information.

3. The communication terminal device according to claim 1, wherein
    the storage is further configured to store master unit candidate identification information for individually identifying a candidate of the master unit, and
    the circuitry is further configured to judge that the source of the received information is the intra-group communication terminal device when the master unit candidate identification information stored in the storage includes identification information for identifying the source of the received information.

4. The communication terminal device according to claim 1, wherein
    the storage is further configured to store group identification information for identifying the intra-group communication terminal device from communication terminal devices of other groups, and
    the circuitry is further configured to judge whether or not the source of the received information is the intra-group communication terminal device based on comparing the group identification information stored in the storage with identification information for identifying the source of the received information.

5. The communication terminal device according to claim 1, wherein the intra-group communication terminal device is a device of a predefined group of communication terminal devices for which data communications thereamong is desired.

6. The communication terminal device according to claim 1, wherein the circuitry is further configured to judge, if a MAC address of the master unit is stored in a blacklist, which is information that records devices that the communication terminal device does not accept as the master unit, that the master unit is not suitable as the master unit of the communication terminal device.

7. A communication terminal device connected to a network and performing data communications with an intra-group communication terminal device through the network, the communication terminal device comprising:
    a storage configured to store received information by a communication terminal device; and
    circuitry configured to:
        judge, based on the received information stored in the storage, whether or not a source of the received information is the intra-group communication terminal device;
        monitor, while the communication terminal device is operating by a slave unit operation mode and while a first master unit in which the communication terminal device is registered is operating by a master unit operation mode, whether or not a second master unit other than the first master unit exists in the intra-group communication terminal device based on the judgement;
acquire first judging criterion information used as a criterion which judges a priority of the first master unit as a master unit and second judging criterion information used as a criterion which judges a priority of the second master unit as the master unit; and
decide, when the second master unit is detected by the monitoring, based on the first judging criterion information and the second judging criterion information, one of the first master unit and the second master unit as the master unit for the communication terminal device, wherein
the master unit operation mode is the operation mode of the first master unit operating as the master unit, and
the slave unit operation mode is the operation mode of the communication terminal device operating as a slave unit.

8. The communication terminal device according to claim 7, wherein the circuitry is further configured to judge, if a MAC address of the master unit is stored in a blacklist, which is information that records devices that the communication terminal device does not accept as the master unit, that the master unit is not suitable as the master unit of the communication terminal device itself.

9. An information communication system comprising:
a plurality of communication terminal devices connected to a network, a communication terminal device of the communication terminal devices comprising:
a storage configured to store information used as a criterion for switching an operation mode between a master unit operation mode and a slave unit operation mode, the information including judging criterion information used as a criterion for judging a priority of the communication terminal device as a master unit; and
circuitry configured to:
judge, based on received information by the communication terminal device, whether or not a source of the received information is an intra-group communication terminal device other than the self communication terminal device among the plurality of the communication terminal devices;
monitor whether or not the intra-group communication terminal device is the master unit based on the judgement;
acquire the judging criterion information of the intra-group communication terminal device detected as the master unit by the monitoring; and
switch, while the communication terminal device is operating by the master unit operation mode and when the intra-group communication terminal device is detected as the master unit by the monitoring, the master unit operation mode of the communication terminal device to the slave unit operation mode based on the judging criterion information of the communication terminal device and the judging criterion information of the intra-group communication terminal device detected as the master unit, wherein
the master unit operation mode is the operation mode of the communication terminal device operating as the master unit, and
the slave unit operation mode is the operation mode of the communication terminal device operating as a slave unit.

10. The information communication system according to claim 6, wherein
the plurality of communication terminal devices includes a plurality of intra-group communication terminal devices for which data communications among the plurality of the intra-group communication terminal devices and the device is desired,
the plurality of communication terminal devices includes a plurality of out-group communication terminal devices for which data communications among the plurality of the intra-group communication terminal devices and the device is not desired,
the intra-group communication terminal device is one of the plurality of intra-group communication terminal devices, and
the circuitry is configured to judge, based on the received information by the communication terminal device, whether or not the source of the received information is the intra-group communication terminal device as opposed to one of the plurality of out-group communication terminal devices.

11. The information communication system according to claim 9, wherein the circuitry is further configured to judge, if a MAC address of the master unit is stored in a blacklist, which is information that records devices that the communication terminal device does not accept as the master unit, that the master unit is not suitable as the master unit of the communication terminal device itself.

12. A non-transitory computer-readable storage medium storing computer-readable instructions that, when executed by a computer including storage and circuitry, cause the computer to perform a method comprising:
performing data communications with an intra-group communication terminal device through a network;
storing information used as a criterion for switching an operation mode between a master unit operation mode and a slave unit operation mode, the information including judging criterion information used as a criterion for judging a priority of the computer as a master unit,
judging, based on received information by the computer, whether or not a source of the received information is the intra-group communication terminal device;
monitoring whether or not the intra-group communication terminal device is the master unit based on the judgement;
acquiring the judging criterion information of the intra-group communication terminal device detected as the master unit by the monitoring; and
switching, while the computer is operating by the master unit operation mode and when the intra-group communication terminal device is detected as the master unit by the monitoring, the master unit operation mode of the computer to the slave unit operation mode based on the judging criterion information of the computer and the judging criterion information of the intra-group communication terminal device detected as the master unit, wherein
the master unit operation mode is the operation mode of the computer operating as the master unit, and
the slave unit operation mode is the operation mode of the computer operating as a slave unit.

13. A non-transitory computer-readable storage medium storing computer-readable instructions that, when executed by a computer including storage and circuitry, cause the computer to perform a method comprising:
- performing data communications with an intra-group communication terminal device through a network;
- judging, based on information received by the computer and stored in a storage, whether or not a source of the received information is the intra-group communication terminal device;
- monitoring, while the computer is operating by a slave unit operation mode and while a first master unit in which the computer is registered is operating by a master unit operation mode, whether or not a second master unit other than the first master unit exists in the intra-group communication terminal device based on the judgement;
- acquiring first judging criterion information used as a criterion which judges a priority of the first master unit as a master unit and second judging criterion information used as a criterion which judges a priority of the second master unit as the master unit; and
- deciding, when the second master unit is detected by the monitoring, based on the first judging criterion information and the second judging criterion information, one of the first master unit and the second master unit as the master unit for the computer, wherein
- the master unit operation mode is the operation mode of the first master unit operating as the master unit, and
- the slave unit operation mode is the operation mode of the computer operating as a slave unit.

14. An information communication method for performing data communications between a plurality of communication terminal devices, a communication terminal device of the communication terminal devices including circuitry and having a master unit operation mode operating as a master unit and a slave unit operation mode operating as a slave unit, the method comprising:
- storing, for each of the plurality of communication terminal devices, information used as a criterion for switching an operation mode between the master unit operation mode and the slave unit operation mode, the information including judging criterion information used as a criterion for judging a priority of each of the communication terminal devices as a master unit;
- judging, based on received information by the communication terminal device, whether or not a source of the received information is an intra-group communication terminal device other than the communication terminal device among the plurality of the communication terminal devices;
- monitoring, in the communication terminal device, whether or not the intra-group communication terminal device is the master unit based on the judgement;
- acquiring the judging criterion information of the intra-group communication terminal device detected as the master unit by the monitoring; and
- switching, while the communication terminal device is operating by the master unit operation mode and when the intra-group communication terminal device is detected as the master unit by the monitoring, the master unit operation mode of the communication terminal device to the slave unit operation mode based on the judging criterion information of the communication terminal device and the judging criterion information of the intra-group communication terminal device detected as the master unit.

\* \* \* \* \*